(12) United States Patent
Elms et al.

(10) Patent No.: US 11,351,479 B2
(45) Date of Patent: Jun. 7, 2022

(54) METHOD AND DEVICE FOR SEPARATING A LIGHTER DENSITY FLUID FROM A HEAVIER DENSITY FLUID

(71) Applicant: HAVEN TECHNOLOGY SOLUTIONS LLC, Magnolia, TX (US)

(72) Inventors: David James Elms, Magnolia, TX (US); Gregory Allen Hudspeth, Amarillo, TX (US)

(73) Assignee: Haven Technology Solutions LLC, Magnolia, TX (US)

( * ) Notice: Subject to any disclaimer, the term of this patent is extended or adjusted under 35 U.S.C. 154(b) by 0 days.

(21) Appl. No.: 16/573,828

(22) Filed: Sep. 17, 2019

(65) Prior Publication Data

US 2020/0086234 A1 Mar. 19, 2020

Related U.S. Application Data

(60) Provisional application No. 62/733,493, filed on Sep. 19, 2018, provisional application No. 62/873,748, filed on Jul. 12, 2019.

(51) Int. Cl.
*B01D 17/02* (2006.01)
*B04C 3/06* (2006.01)
(Continued)

(52) U.S. Cl.
CPC ..... *B01D 17/0217* (2013.01); *B01D 19/0057* (2013.01); *B04C 3/06* (2013.01); *B04C 2009/007* (2013.01)

(58) Field of Classification Search
CPC .. B01D 17/0217; B01D 19/0057; B04C 3/06; B04C 2009/007
See application file for complete search history.

(56) References Cited

U.S. PATENT DOCUMENTS

| 1,509,911 | A | * | 9/1924 | Stebbins | .................. B04C 5/00 |
| | | | | | 55/413 |
| 1,970,783 | A | * | 8/1934 | Walker | ............... B01D 19/0057 |
| | | | | | 96/188 |

(Continued)

FOREIGN PATENT DOCUMENTS

| CN | 101272839 A | 9/2008 |
| CN | 201461336 U | 5/2010 |

(Continued)

OTHER PUBLICATIONS

Taiwan Intellectual Property Office, Exam and Search Report, Application No. 108133826, dated Mar. 30, 2020, 11 pages, Taiwan.

(Continued)

*Primary Examiner* — Liam Royce
(74) *Attorney, Agent, or Firm* — Haynes and Boone, LLP

(57) ABSTRACT

A fluid separation apparatus for removing one fluid component from another fluid component in a fluid stream includes an impeller disposed between an annular inlet chamber and a first fluid chamber having a hollow, conical trapezoidal shape with a diameter that reduces along a portion of the length of the first fluid chamber. The impeller redirects a liquid flowing in a circular swirling flow path along the wall of the inlet chamber to an outlet an inlet of the first fluid chamber disposed adjacent the central axis of the first fluid chamber. A coaxially aligned extraction pipe extends into a lighter density fluid envelope formed in the first fluid chamber adjacent the inlet of the first fluid chamber. The extraction pipe may be dynamically adjustable based on the shape of the lighter density fluid envelope to maximize removal of lighter density fluid from the lighter density fluid envelope.

21 Claims, 12 Drawing Sheets

(51) Int. Cl.
  *B01D 19/00*   (2006.01)
  *B04C 9/00*   (2006.01)

(56) References Cited

U.S. PATENT DOCUMENTS

| | | | |
|---|---|---|---|
| 2,037,426 A * | 4/1936 | Mckeever | E21B 43/34 |
| | | | 96/188 |
| 2,338,779 A | 1/1944 | Mutch | |
| 2,425,110 A * | 8/1947 | Mccurdy | B04C 3/00 |
| | | | 210/512.1 |
| 6,024,874 A | 2/2000 | Lott | |
| 2008/0098893 A1 | 5/2008 | Ringenberger et al. | |
| 2008/0115469 A1 | 5/2008 | Lane et al. | |
| 2018/0361288 A1 * | 12/2018 | Nie | B01D 45/06 |

FOREIGN PATENT DOCUMENTS

| | | | |
|---|---|---|---|
| CN | 203598956 U | 5/2014 | |
| CN | 105142794 A | 12/2015 | |
| CN | 105289114 A * | 2/2016 | B01D 45/06 |
| CN | 106215464 A | 12/2016 | |
| CN | 207857150 U | 9/2018 | |
| EP | 1445025 B1 | 7/2008 | |
| GB | 851498 A * | 10/1960 | B04C 5/06 |
| GB | 1249358 A * | 10/1971 | B04C 9/00 |
| WO | WO 2017/0191242 A1 | 11/2017 | |

OTHER PUBLICATIONS

Taiwan Intellectual Property Office, Exam and Search Report, Application No. 108133826, dated Mar. 30, 2020, 30 pages, Taiwan.
Search Report and Written Opinion issued for International Patent Application No. PCT/US2019/051583, dated Dec. 4, 2019, 13 pages.
Written Opinion issued for Singapore Patent Application No. 11202102768S, dated Oct. 1, 2021, 9 pages.

* cited by examiner

METHOD AND DEVICE FOR SEPARATING A LIGHTER DENSITY FLUID FROM A HEAVIER DENSITY FLUID

PRIORITY CLAIM

The present application claims the benefit of U.S. Provisional Application No. 62/733,493, entitled "Method and Device for Removing Bubbles from Liquid," filed Sep. 19, 2018, and U.S. Provisional Application No. 62/873,748, entitled "Method and Device for Separating a Lighter Density Fluid from a Heavier Density Fluid," filed Jul. 12, 2019, both of which are herein incorporated by reference in their entireties.

TECHNICAL FIELD

The present invention relates to separation and removal of a lighter density fluid, such as gas or oil, from a heaver density fluid, and more particularly, to a system which utilizes an impeller and/or a movable extraction pipe to separate and remove a lighter density fluid from a heavier density fluid.

BRIEF DESCRIPTION OF DRAWINGS

Various embodiments of the present disclosure will be understood more fully from the detailed description given below and from the accompanying drawings of various embodiments of the disclosure. In the drawings, like reference numbers may indicate identical or functionally similar elements.

DESCRIPTION OF EMBODIMENTS

In the following, embodiments of a of a fluid separation apparatus for the separation and removal of lighter density fluid from a heavier density fluid according to the present invention will be described in detail with reference to the accompanying drawings.

Disclosed herein are embodiments of a fluid separation apparatus for the separation and removal of lighter density fluid from heavier density fluid, wherein the fluid separation apparatus utilizes an impeller to redirect the flow path of a swirling input fluid to be treated from a first larger diameter to a second smaller diameter before introducing the swirling fluid into a hollow, conical trapezoidal shaped first fluid chamber with a diameter that reduces along a portion of the length of the first fluid chamber. The impeller facilitates the collection of lighter density fluid from the input fluid along a central axis of the first fluid chamber while the heavier density fluid of the input fluid is pushed out by centrifugal force to the outer wall of the fluid chamber. A coaxially aligned extraction pipe extends into the fluid chamber so that an inlet of the extraction pipe is positioned within a lighter density envelope formed by the lighter density fluid along the central axis. In some embodiments, the extraction pipe may be adjustable based on the shape of the lighter density fluid envelope, which may change based on the viscosity of the fluid flowing into the first fluid chamber. In some embodiments, a sensor is positioned upstream or downstream of the impeller to measure a quality of the fluid flowing into the apparatus or a quality of a fluid flowing out of the apparatus and the measured quality can be utilized to dynamically adjust the position of the extraction pipe within the lighter density fluid envelope. In certain embodiments with a dynamically adjustable extraction pipe, the impeller need not be included.

Figure 1:
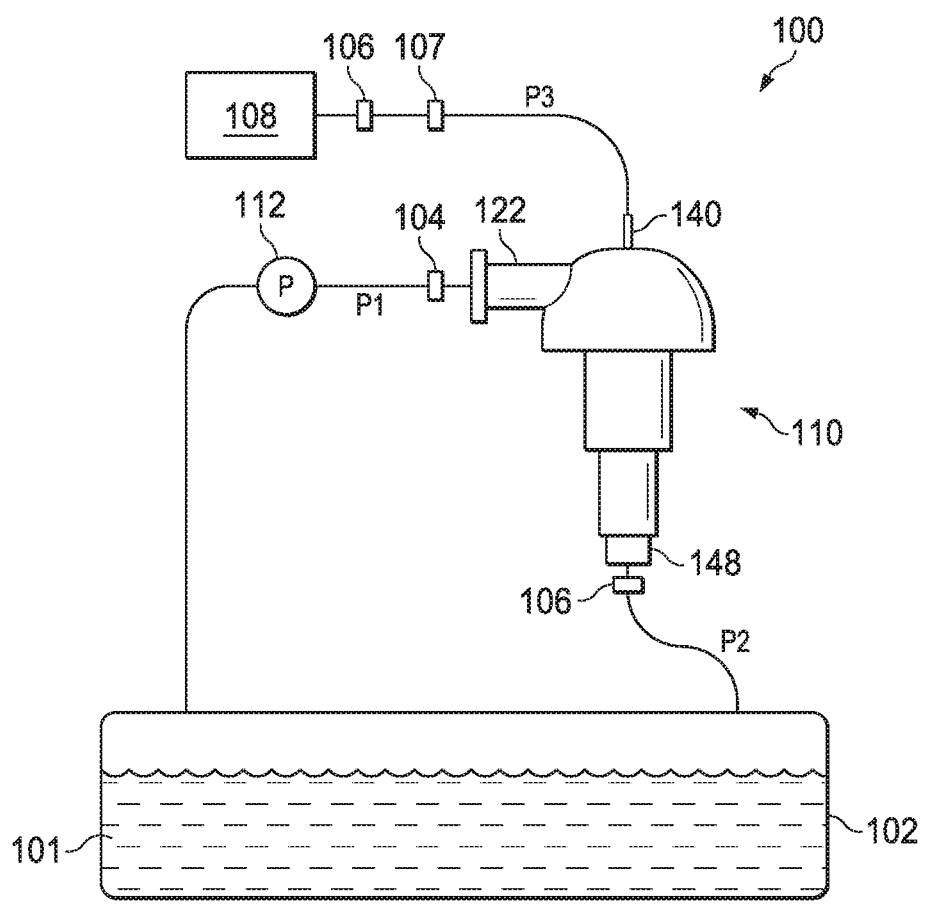
FIG. 1 is a view showing a fluid system into which a fluid separation apparatus for separation and removal of lighter density fluid from a heavier density fluid.

FIG. 1 is a view showing a fluid system 100 for the separation and removal of lighter density fluid from heavier density fluid according to the present invention is applied.

In a fluid system 100 shown in FIG. 1, a fluid 101 to be treated is stored in a main tank 102 and will be referred to as the "input fluid" 101 for purposes of clarity. The input fluid 101 is generally comprised of a heavier density fluid and a lighter density fluid, such as, for example liquid in which gas is suspended or water in which oil is suspended, and from which it is desirable to remove the lighter density fluid entrained therein. In one or more embodiments, input fluid 101 stored in main tank 102 may be pressure-fed to a fluid separation apparatus 110 via a pipe P1 by using a pump 112.

In the fluid separation apparatus 110, the input fluid 101 which is supplied via the pipe P1 and which contains heavier density fluid mixed with lighter density fluid to be removed therefrom, is separated into a first fluid component (primarily heavier density fluid), and a second fluid component (primarily lighter density fluid relative to the first fluid component). The first fluid component with lighter density fluid removed therefrom and exits apparatus 110 through pipe P2. The second fluid component exists apparatus 110 through pipe P3. The first fluid component existing through pipe P2 may be returned to main tank 102. The second fluid component existing through pipe P3 may be collected in a separate storage tank 108. In some embodiments, separate storage tank 108 may be integrally formed as part of apparatus 110 as described below. An upstream sensor 104 may be provided to detect or measure a property of the input fluid pumped into apparatus 110. A downstream sensor 106 may be provided to detect or measure a property of the lighter density fluid exiting apparatus 110 along pipe P3. Similarly, a flow control mechanism 107 may be positioned along the flow path of fluid passing through pipe P3 to control release of fluid from fluid separation apparatus 110 into storage tank 108. In one or more embodiments, flow control mechanism 107 is a valve. In one or more embodiments, flow control mechanism 107 is a pump which may be utilized to draw the lighter density fluid from fluid separation apparatus 110. A pressure regulator 148 may be positioned along the flow path of heavier density fluid flowing along pipe P2 to control back pressure within separation apparatus 110.

Figure 2A:
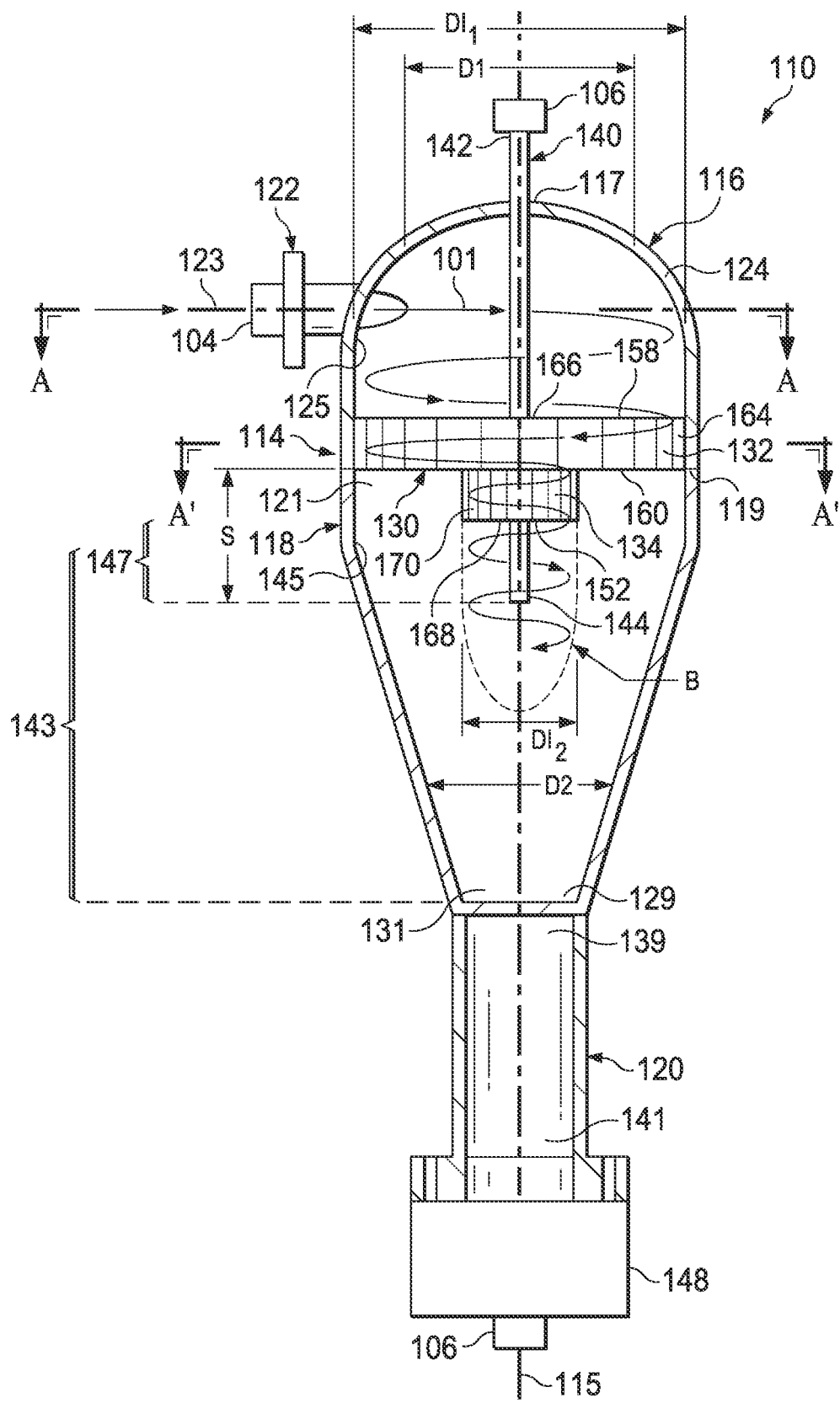
FIG. 2A is a cross-sectional side view showing an embodiment of a fluid separation apparatus such as shown in FIG. 1.
Figure 3A:
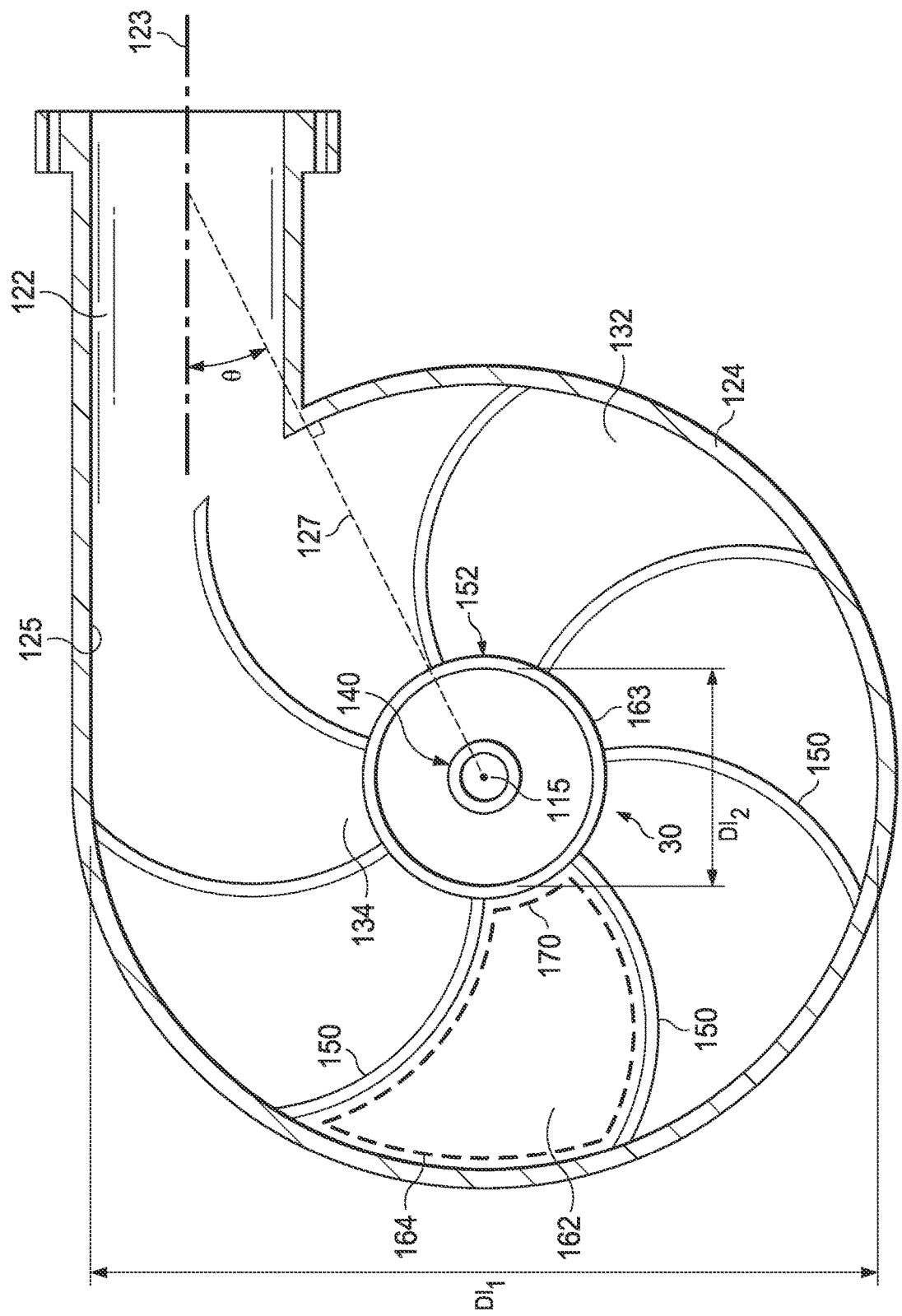
FIGS. 3A and 3B are cross-sectional top views of embodiments of a fluid separation apparatus shown in FIG. 1.
Figure 3B:
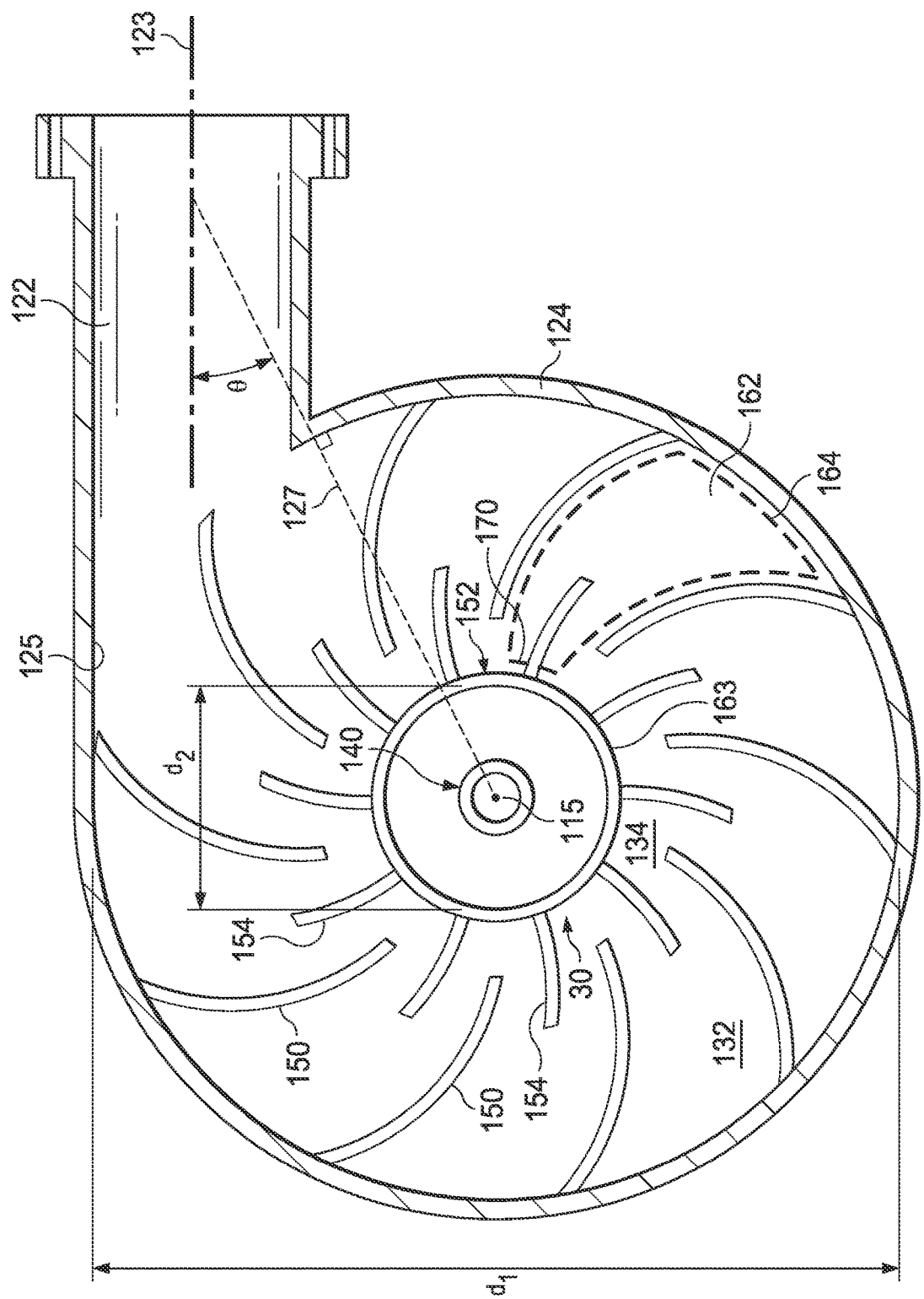

FIG. 2A is a cross-sectional side view showing an example of the fluid separation apparatus 110 used in the separation removal and circulation system 100 of lighter density fluid from heavier density fluid. FIGS. 3A and 3B are cross-sectional top views of various embodiments of the fluid separation apparatus 110.

The fluid separation apparatus 110 is configured such that liquid introduced into the fluid separation apparatus 110 and containing lighter density fluid, such as entrained air, to be removed therefrom is separated, by using a swirling flow, into a first fluid component with lighter density fluid substantially removed therefrom and a second fluid component containing primarily lighter density fluid. Fluid separation apparatus 110 is formed of a body 114 extending along a central axis 115 and having an inlet chamber 116 and a first fluid chamber 118. A second fluid chamber 120 may extend from first fluid chamber 118. Inlet chamber 116 is shaped to promote circular swirling flow to the input fluid introduced thereto. In one or more embodiments, inlet chamber 116 is an annular chamber having a first end 117 and a second end 119. In one or more embodiments, inlet chamber 116 is bowl shaped with an annular chamber gradually increasing in diameter D1 from the first end 117 to the second end 119. In other embodiments, inlet chamber 116 is a cylinder. In some embodiments, the first end 117 may be enclosed and the second end 119 may be open.

An inlet 122 in fluid communication with a main tank 102 is provided in a wall 124 of inlet chamber 116 between the first and second ends 117, 119. As best seen in FIG. 2, while inlet 122 need not be tangentially arranged, in some embodiments inlet 122 is preferably arranged to be generally tangentially positioned in wall 124 so that fluid introduced into inlet chamber 116 flows along the inner surface 125 of wall 124. As shown specifically in FIGS. 3A and 3B, in this regard, the axis or centerline 123 of inlet 122 forms an angle θ with a radial line 127 passing perpendicularly through central axis 115 of inlet chamber 116. As such, the input fluid follows a swirling flow path as it follows the wall 124 around its periphery. Positioned at the second end 119 of inlet chamber 116 is an impeller 130. In one or more embodiments, impeller 130 is fixed relative to inlet chamber 116. Impeller 130 may be attached in the open second end 119 of inlet chamber 116, thereby enclosing inlet chamber 116.

Impeller 130 generally includes an outer impeller blade section 132 in fluid communication with an inner impeller blade section 134 with an upper or first outer shroud 158 and a lower or second outer shroud partially enclosing at least impeller blade section 132 to form a flow path for fluid 101 through impeller blade section 132. Outer impeller blade section 132 is generally in fluid communication with circular swirling fluid flow of inlet chamber 116 adjacent the periphery of wall 124 at a first impeller diameter DI1. Inner impeller blade section 134 is in fluid communication with first fluid chamber 118 at a second impeller diameter DI2 smaller than the first impeller diameter DI1 so that input fluid flowing into outer impeller blade section 132 from inlet chamber 116 is discharged from inner impeller blade section 134 into first fluid chamber 118 in the swirling-flow tangential direction at second impeller diameter DI2.

The first fluid chamber 118 has a first end 121 and a second end 129 and is formed to have a portion 143 of which is a conical trapezoidal shape with a diameter D2 that gradually reduces between first end 121 and second end 129. A first end 139 of second fluid chamber 120 is in fluid communication with the second end 129 of the first fluid chamber 118, and a second end 141 of the second fluid chamber 120 is connected to the pipe P2 (see FIG. 1). Second end 129 may terminate in an outlet 131.

Further, at the first fluid chamber 118, an extraction pipe 140 having a first end 142 and a second end 144, the second end 144 of which is open to first fluid chamber 118, is provided along the central axis 115 of the fluid separation apparatus 110. In one or more embodiments, the extraction pipe 140 is preferably sufficiently thin or narrow, i.e., of a diameter substantially less than the diameter D2 of the first fluid chamber 118 adjacent the first end 121, so as to maintain a lower pressure in the extraction pipe 140 relative to the first fluid chamber 118. In this regard, extraction pipe 140 may be a vent tube where axis 115 is generally vertical, whereby gas may travel up the vent tube based on a pressure difference. Pipe P3 is connected to the other end 142 of the extraction pipe 140. In some embodiments, extraction pipe 140 generally passes through the center of impeller 30 along central axis 115.

In the fluid separation apparatus 110 configured as described above, when input fluid containing lighter density fluid to be removed from heavier density fluid is pressurized by the pump 112, so as to be introduced from the main tank 102 into the inlet 122 of inlet chamber 116, the input fluid is directed to flow through the outer impeller blade section 132 of impeller 130 and out from impeller 130 through inner impeller blade section 134, and thereby forming a swirling flow of the input fluid in the first fluid chamber 118.

Since the first fluid chamber 118 is formed to include the conical trapezoidal shape the diameter D2 of which is gradually reduced between the first end 121 and the second end 129, the centrifugal force generated by the swirling flow causes the heavier density fluid of the input fluid to collect along the inner side of peripheral wall 145 of the first fluid chamber 118, and causes the lighter density fluid to be collected near the center axis 115 of the first fluid chamber 118 in a vortex, as shown by lighter density fluid envelope B in FIG. 2. In some embodiments, extraction pipe 140 is adjacent lighter density fluid envelope B at the first end 121 of first chamber 118. In some embodiments, extraction pipe 140 extends past first end 121 of first fluid chamber 118 and into lighter density fluid envelope B. In some embodiments, extraction pipe 140 may be translated axially to alter the distance S between the second end 144 of extraction pipe 140 and the first end 121 of first fluid chamber 118, thereby adjusting the positioning of extraction pipe 140 within lighter density fluid envelope B. In some embodiments, a portion of extraction pipe 140 at second end 144 telescopes, allowing the distance S to be adjusted as desired. As will be described below, the distance S is selected based on the viscosity of the particular fluid from which lighter density fluid are being removed, it having been discovered that the viscosity of the fluid alters the shape of envelope B, and thus, it is necessary, based on the viscosity of the fluid, to adjust the position of second end 144 in envelope B to maximize lighter density fluid removal.

In some embodiments, release of second lighter density fluid through extraction pipe 140 and flow of heavier density fluid along pipe P3 (see FIG. 1) may be controlled by a valve 107 positioned along the flow path of the second lighter density fluid passing into extraction pipe 140. In this regard, valve 107 may be a throttling valve.

In some embodiments, back pressure applied in the first fluid chamber 118 urges the lighter density fluid collected along the center axis 115 of the first fluid chamber 118 in lighter density fluid envelope B to flow out of first chamber 118 into extraction pipe 140 and discharged into the pipe P3. In one or more embodiments, fluid separation apparatus 110 may include a pressure regulator 148 to regulate the backpressure in first fluid chamber 118. Pressure regulator 148 may be adjustable to alter the backpressure as desired for different flow conditions. Although not limited to a particular location, in some embodiments, pressure regulator 148 may be positioned downstream of second fluid chamber 120.

Further, the heavier density fluid in the first fluid chamber 118 from which the lighter density fluid has been separated flows out of chamber 118, as the first fluid, into the pipe P2 via the second fluid chamber 120, so as to be returned to the main tank 102 or otherwise as desired.

It will be appreciated that axis 115 need not have any particular orientation, and that the orientation of fluid separation apparatus 110 may be determined based on the flow rate of the input fluid and the relative densities of the heavier and lighter fluid components. As such, while axis 115 is illustrated as substantially vertical in FIG. 2A, it need not be. For example, where flow rates are sufficiently high, axis 115 may be horizontal. In such case, the heavier density fluid will still be forced to outer wall 145 and the lighter density fluid will form an envelope B along axis 115. Thus, in FIG. 2B, axis 115 is illustrated as generally horizontal.

Figure 2B:
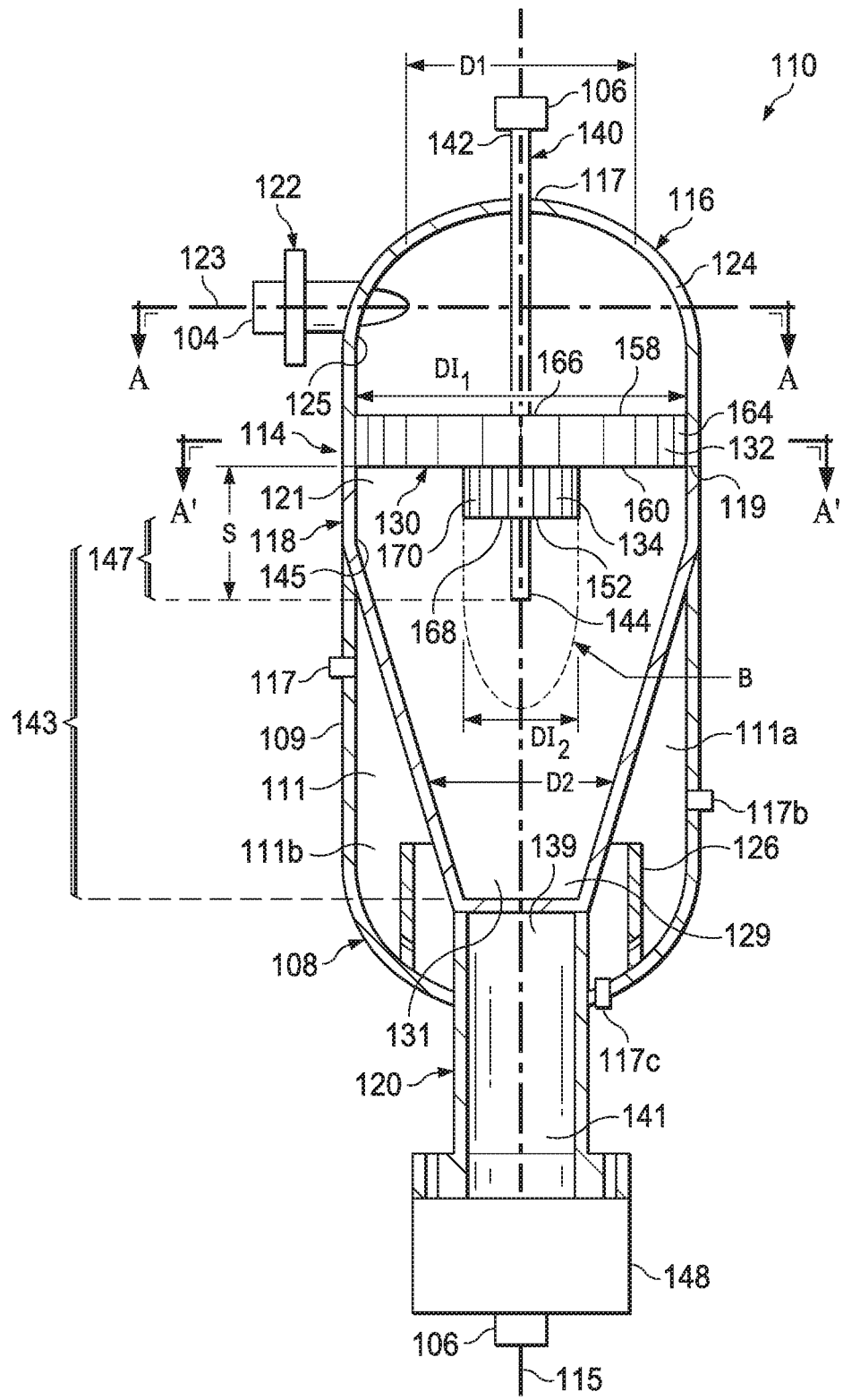
FIG. 2B is a cross-sectional side view showing another embodiment of a fluid separation apparatus.

Moreover, in the embodiment of FIG. 2B, previously described storage tank 108 is integrally formed as part of fluid separation apparatus 110. As such, storage tank 108 is formed of an additional wall 109 extending around at least a portion of body 114 so as to form an additional storage chamber 111. In one or more embodiments, additional wall 109 may fully extend around both inlet chamber 116 and first fluid chamber 118. In one or more embodiments, additional wall 109 may extend from wall 145 where wall 145 begins to taper, as described above. In this embodiment, additional wall 109 may take the shape of inlet chamber 116 so that fluid separation apparatus 110 appears uniform in shape along the length of axis 115. In any event, in such embodiments, additional storage chamber 111 is formed between the tapered portion of wall 145 and additional wall 109.

Integrally formed storage tank 108 may include an inlet 117a in fluid communication with extraction pipe 140, such that second fluid component exiting through extraction pipe 140 may flow into additional storage chamber 111. Likewise, integrally formed storage tank 108 may include a first outlet 117b for extracting second fluid component from storage chamber 111. In one or more embodiments, a weir 126 may be positioned within storage chamber 111. Those skilled in the art will appreciate that while second fluid component is comprised primarily of lighter density fluid, some heavier density fluid may still be entrained or mixed with the lighter density fluid. As such, storage chamber 111 may function as a settling tank, whereby the heavier density fluid will settle in the lower portion 111b of chamber 111 and the lighter density fluid will rise to an upper portion 111a of chamber 111. In such case, a weir 126 as shown may be utilized to separate the remaining heavier density fluid from the lighter density fluid in a manner well known in the industry. Thus, for example, the lighter density fluid may be skimmed or extracted through first outlet 117b generally placed above weir 126 in the upper portion 111a of chamber 111, and heavier density fluid may be extracted through second outlet 117c generally positioned. In the lower portion 111b of chamber 111, such as adjacent the bottom of weir 126.

Turning to FIGS. 3A and 3B, various embodiments of an impeller 30 are shown in more detail. Persons of skill in the art will appreciate that impeller 30 is not limited to a particular type or configuration and the impellers 30 described herein are for illustrative purposes only. As described above, impeller 30 generally includes an outer impeller section 132 and an inner impeller section 134. Outer impeller section 132 and inner impeller section 134 may be separate impellers as shown in FIG. 3B or may be integrally formed as shown in FIG. 3A. Outer impeller section 132 includes one or more blades or vanes 150 that spiral inward towards a hub 152. Inner impeller blade section 134 likewise includes one or more blades or vanes 154 disposed about hub 152. It will be appreciated that in some impeller configurations, blades 150 and blades 154 are the same set of blades (such as shown in FIG. 3A), while in other impeller configurations, blades 150 and 154 are separate sets of blades (such as shown in FIG. 3B). Likewise, while only one or two sets of blades are described, the disclosure is not limited to the number of sets of blades utilized in the impeller 30. In one or more embodiments, such as shown in FIG. 3B, blades 150 and 154 may be interleaved. In any event, blades 150 may be disposed between the upper or first outer shroud 158 and the lower or second outer shroud 160 which together with successive blades 150 form a flow passage 162 having an inlet 164 formed at the radial edge of the shrouds 158, 160. Hub 152 is a tubular which is generally coaxial with shrouds 158, 160 and is formed of a hub wall 163 which defines flow passage 162 between a first hub end 166 and a second hub end 168. Blades 154 of inner impeller section 134 extend outward from hub wall 163. In one or more embodiments, blades 154 extend from hub wall 163 from adjacent the second hub end 168, thereby forming an outlet 170 for flow passage 162. Thus, as described, flow passage 162 has an inlet 164 at an outer perimeter of shroud 158 of impeller 30 and an outlet 170 at an inner perimeter adjacent hub wall 163 of hub 152.

Impeller 30 is positioned adjacent the second end 119 of inlet chamber 116 so that the second hub end 168 of hub 152 is adjacent the first end 121 of first fluid chamber 118. As such, outlet 170 is in fluid communication with first fluid chamber 118, and in particular, outlet 170 is in fluid communication with first fluid chamber 118 in the vicinity of the center axis 115 and thus, generally adjacent lighter density fluid envelope B.

In operation, an input fluid stream is introduced into inlet chamber 116 of fluid separation apparatus 110 via inlet 122. The input fluid stream generally comprises a first fluid component and a second fluid component and it is desired to separate the fluid components from one another. In some embodiments, the first fluid component is a liquid of a first density and the second fluid component is a liquid of a second density less than the density of the first fluid component. In other embodiments, the first fluid component is primarily liquid and the second fluid component is primarily lighter density. In other embodiments, the first fluid component is primarily water and the second fluid component is primarily oil. In still yet other embodiments, the first fluid component is a liquid of a first weight and the second fluid component is a liquid of a second weight less than the weight of the first fluid component.

The inlet 122 is arranged so that the input fluid flow upon entry is generally tangential to inlet chamber 116, flowing along the inner surface 125 of wall 124 of inlet chamber 116 in a swirling flow path. Because inlet 164 of flow passage 162 of impeller 30 is adjacent wall 124 of inlet chamber 116, fluid flowing along wall 124 is directed into flow passage 162 of impeller 30 where the blades 150 direct the flow radially inward towards hub 152 and axially from first hub end 166 to second hub end 168. Notably, the shape of blades 150 may be selected to spiral generally in the same clockwise or counterclockwise direction as the swirling flow path of the fluid flowing along wall 124. The flowing fluid exits the inner impeller blade section 134 at the first end 121 of conical trapezoidal shaped first fluid chamber 118, generally adjacent center axis 115. It will be appreciated that blades 150 of the outer impeller section 132 maintain the swirling flow of the fluid as the fluid passes from inlet chamber 116 and enters impeller 30. Likewise, blades 154 of inner impeller section 134 maintain the swirling flow of the fluid as the fluid exits impeller 30 at a location spaced radially inward from the outer wall 145 of first fluid chamber 118 (and generally adjacent center axis 115). It will be appreciated that in contrast to typical uses of an impeller where flow is typically from an inner radius to an outer radius, the impeller 30 of the disclosure is used for a reverse flow, wherein the flow is form an outer radius to an inner radius.

In any event, as the input fluid 101 (see FIG. 1) flows into first fluid chamber 118, centrifugal force acting on the swirling input fluid drives the heavier fluid component of the input fluid to the outer wall 145 of first fluid chamber 118, where the conical trapezoidal shape of the first fluid chamber 118 causes the heavier density fluid component to continue to swirl as the heavier density fluid moves towards the second end 129 of the first fluid chamber 118. Centrifugal forces on the lighter density fluid component of the input fluid 101 is much less than the centrifugal forces on the heavier fluid component of the input fluid 101, and as such, the lighter density portion of input fluid 101 tends to remain in the vicinity of the point of introduction of the input fluid 101 into first fluid chamber 118. Specifically, the lighter density portion of input fluid 101 collects near the central axis 115 of the first fluid chamber 118, generally forming the lighter density fluid envelope B. In some embodiments, back pressure applied in the first fluid chamber 118 can enhance collection of the lighter density portion of input fluid 101 along the central axis 115 generally adjacent the first end 121 of first fluid chamber 118, although lighter density fluid envelope B may extend extent along central axis 115 towards second end 129.

Moreover, because the second end 144 of extraction pipe 140 terminates within the lighter density fluid envelope B, the lighter density component will flow into extraction pipe 140 and then into the pipe P3 for removal from first fluid chamber 118. It will be appreciated that extraction pipe 140 generally has a lower pressure than first fluid chamber 118, thereby promoting flow of the lighter density component into extraction pipe 140. In one or more embodiments, this may be further enhanced by the back pressure applied to first fluid chamber 118, the backpressure increasing the pressure differential between first fluid chamber 118 and extraction pipe 140, thereby enhancing flow of the lighter density component into extraction pipe 140. In one or more embodiments, this may be further enhanced by a pump 107 to draw lighter density fluid into extraction pipe 140 from envelope B. Pump 107 may be a vacuum pump in some embodiments.

While extraction pipe 140 may be fixed in certain embodiments, in one or more other embodiments, extraction pipe 140 is movable, allowing it to be extended or retracted relative to first fluid chamber 118 so as to position second end 144 to optimize collection or flow of the lighter density component into extraction pipe 140 for removal from first fluid chamber 118. In these embodiments, a movable extraction point is provided, wherein at least a portion 147 of extraction pipe 140 extending into first fluid chamber 118 is movable. Movable portion 147 may be axially movable along the central axis of first fluid chamber 118. In some embodiments, movable portion 147 may be telescoping or otherwise telescopically movable. In other embodiments, extraction pipe 140 may simply move axially along the central axis of first fluid chamber 118. It has been found that the shape and dimensions of lighter density fluid envelope B will change based on the viscosity of the fluid flowing into first fluid chamber 118. Thus, in one or more embodiments, the distance S as shown in FIG. 1 is adjusted based on the particular viscosity of the fluid flowing into first fluid chamber 118. In other words, the distance S as shown in FIG. 1 is adjusted based on the shape of the envelop B to maximize removal of the lighter density fluid from envelope B, the envelope B shape resulting from the viscosity of the particular fluid flowing into first fluid chamber 118. In this regard, system 100 may include a sensor 104 upstream of outlet 170 of flow passage 162 to determine a characteristic of the fluid (see FIGS. 1 and 2). System 100 can automatically adjust the position of second end 144 of extraction pipe 140 in the lighter density fluid envelope based on the measured characteristic. For example, upstream sensor 104 may measure viscosity or be utilized by system 100 to determine viscosity of the fluid entering first fluid chamber 118. In addition or alternatively to upstream sensor 104, a sensor 106 may be positioned downstream of outlet 170 of flow passage 162 to determine a characteristic of the fluid (1) exiting second end 129 of first chamber 118 or (2) entering extraction pipe 140. System 100 can automatically adjust the position of second end 144 of extraction pipe 140 in the lighter density fluid envelope B based on the fluid characteristic measured by sensor 106. For example, where the lighter density fluid is a gas, downstream sensor 106 may measure the presence of gas or gas cut within fluid flow passing through extraction pipe 140 or be utilized to determine the content of gas in liquid existing first fluid chamber 118 via second fluid chamber 120. In any of the foregoing configurations, a sensor, such as upstream sensor 104 or downstream sensor 106, may be utilized to measure a condition of a fluid and dynamically adjust the position of extraction pipe 140 within envelope B during operation.

It will further be appreciated that while the movable extraction pipe 140 has generally been described in association with a fluid separation apparatus 110 having an impeller, in other embodiments, the movable extraction pipe 140 will function equally well with a fluid separation apparatus without an impeller. Thus, in some embodiments, the system of FIG. 2 may be provided without an impeller 130, but generally include all of the other components as generally described herein in combination with an adjustable extraction pipe 140, which, in some embodiments, may be dynamically adjustable based on feedback from one or more sensors, such as sensors 104 and 106.

Figure 4:
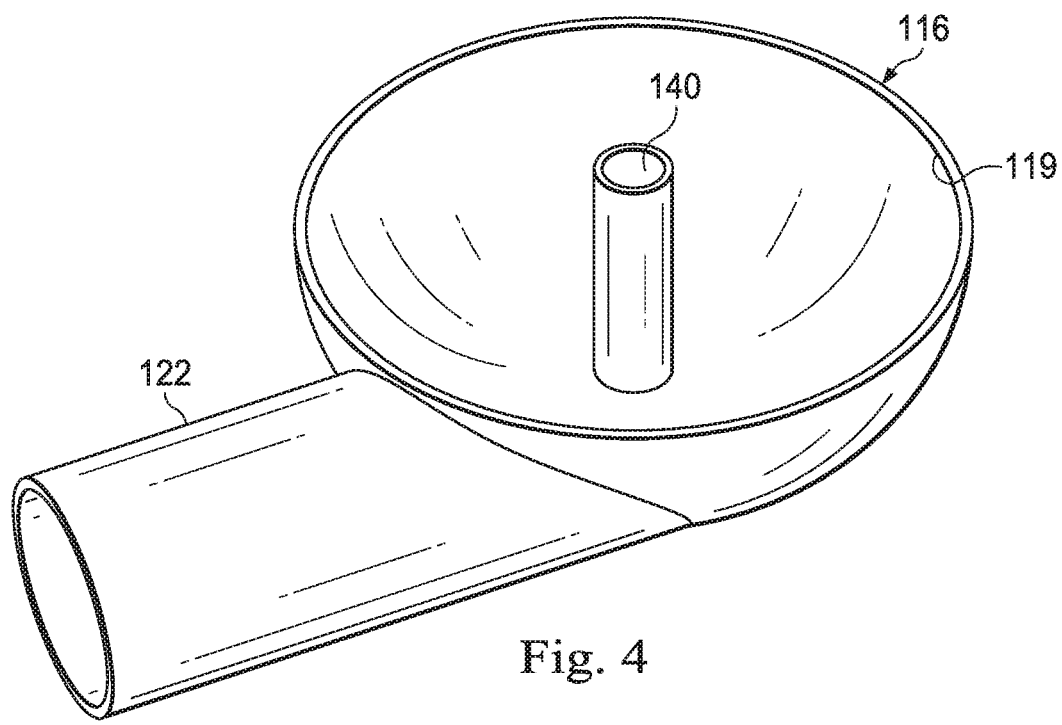
FIG. 4 is a partial assembly view of inlet chamber with the extraction pipe extending therethrough of a fluid separation apparatus.

FIG. 4 is a partial assembly view of inlet chamber 116. In particular, in this embodiment, inlet chamber 116 is depicted as generally bowl shaped with an open second end 119. Extraction pipe 140 is shown as extending co-axially through inlet chamber 116. Inlet 122 is shown tangentially intersecting inlet chamber 116.

Figure 5A:
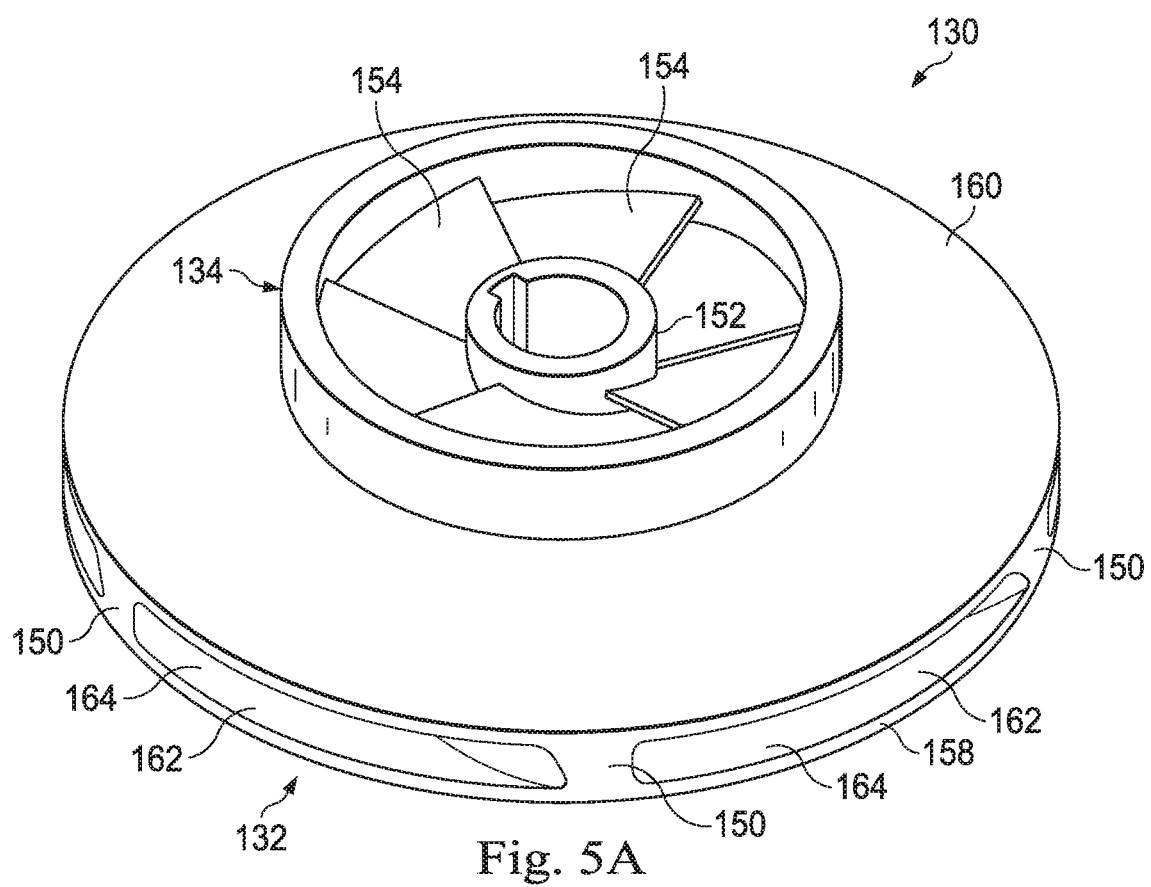
FIG. 5A is a partial assembly view of an impeller installed within the inlet chamber of a fluid separation apparatus.

FIG. 5A illustrates on embodiment of an impeller 130 for use with fluid separation apparatus 110. Impeller 130 is shown upside down in order to illustrate both outer impeller section 132 and inner impeller section 134. Impeller 130 is shown as having a first outer shroud 158 and a second outer shroud 160 between which a plurality of spiraling vanes 150 are positioned. Outer impeller section 132 is generally defined at outer diameter of shrouds 158, 160. Moreover, adjacent vanes 150, together with at least one shroud 158 or 160 that supports vanes 150 form a flow passage 162, the inlet 164 of which is illustrated at the outer radius of vanes 150. Hub 152 is illustrated as extending axially through impeller 130. Vanes 154 of inner impeller section 134 are shown as terminating at a diameter smaller than the outer diameter of shrouds 158, 160.

Figure 5B:
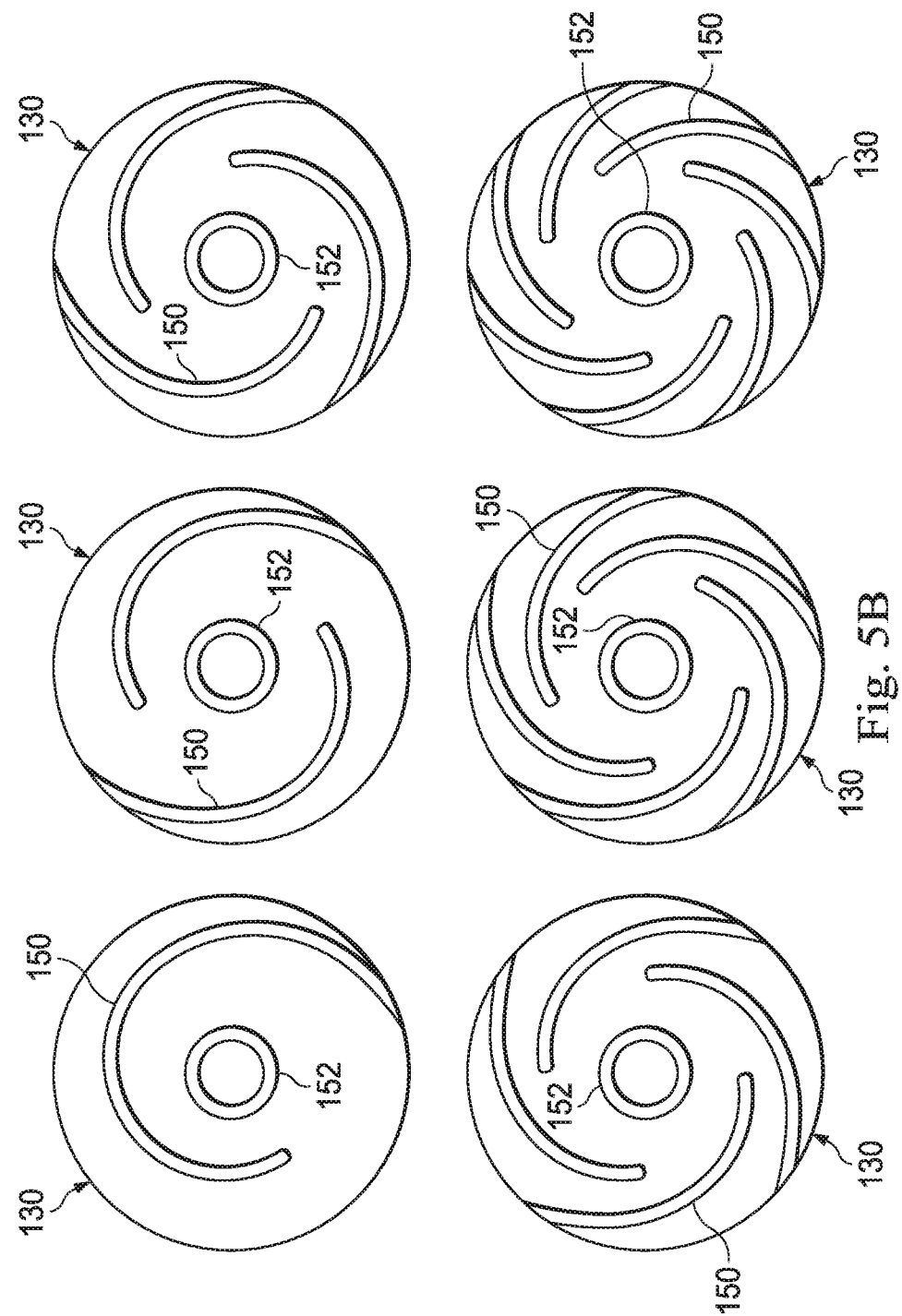
FIG. 5B illustrates various possible embodiments of impeller vane configurations for the impeller of FIG. 5A.

FIG. 5B illustrates various non-limiting embodiments of configurations for vanes 150 and 154 of impeller 130.

Figure 6:
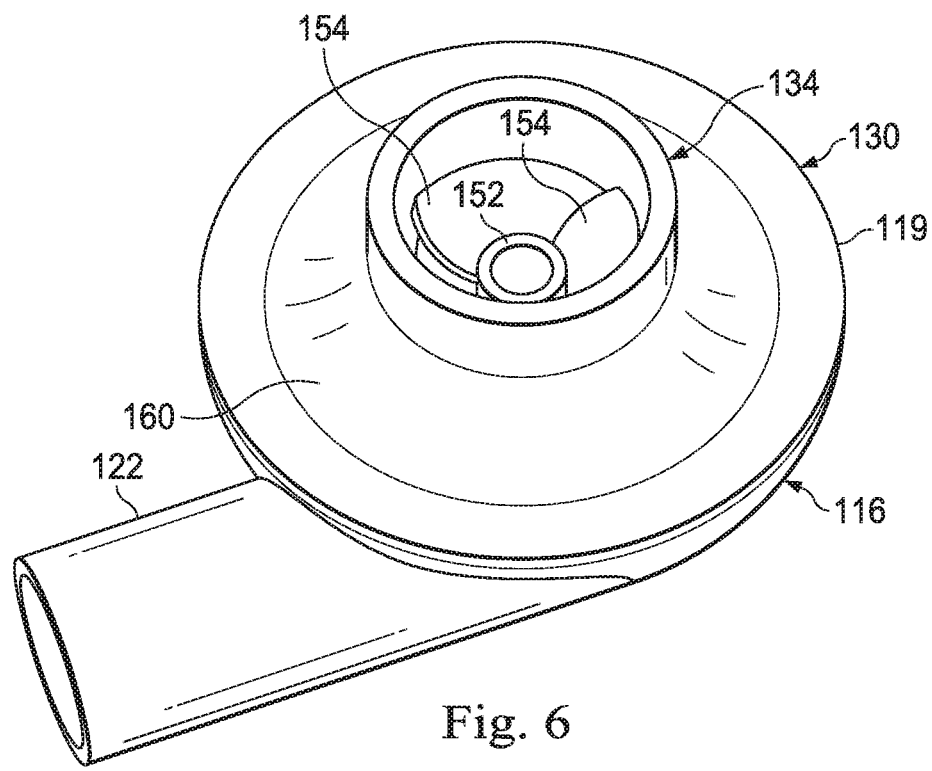
FIG. 6 is a perspective view of one embodiment of an impeller for installation in an inlet chamber of a fluid separation apparatus.

FIG. 6 illustrates impeller 130 positioned at the second end 119 of inlet chamber 116. Second shroud 160 is illustrated as being coaxial with hub 152. Moreover, extraction pipe 140 is shown extending through hub 152. In addition, vanes 154 of inner impeller section 134 are illustrated. Inlet 122 is shown tangentially intersecting inlet chamber 116.

Figure 7:
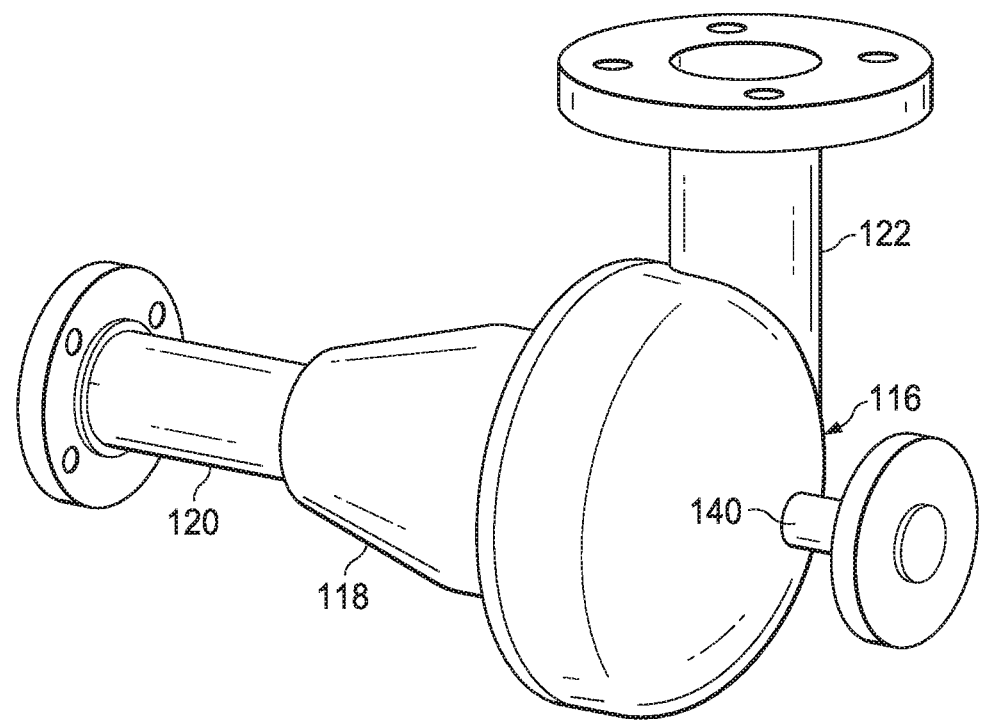
FIG. 7 is a perspective view of the fluid separation apparatus of the disclosure of a fluid separation apparatus.

FIG. 7 illustrates one embodiment of an assembled apparatus 110. Thus, as shown, inlet chamber 116 is shown attached to first fluid chamber 118 which is shown attached to second fluid chamber 120. As shown, inlet chamber 116 in this embodiment is bowl shaped with a diameter that gradually expands. Inlet 122 is shown tangentially intersecting inlet chamber 116 extraction pipe 140 is shown extending coaxially through inlet chamber 116.

While in some embodiments, the fluid separation apparatus 110 has been generally described as separating a gas from a liquid in a fluid flow, in other embodiments, fluid separation apparatus 110 can be utilized to separate liquids or other fluids of different densities, such as oil from water. In such case, the lower density or lighter liquid, namely the second fluid, will generally migrate to the vortex represented by the lighter density fluid envelope B, while the higher density or heavier liquid, namely the first fluid, will migrate outward to the walls of the first fluid chamber 118. In other embodiments, input fluid 101 may be a wet gas, comprised primarily of gas in which liquid is entrained. As such, fluid separation apparatus 110 may be utilized to dry the wet gas. In other embodiments, fluid separation apparatus 110 may also be used to separate higher density gases from lower density gases where the input fluid 101 is simply a gaseous mixture. Thus, lighter density fluid envelope B simply becomes a vortex B formed by the second fluid. This second fluid can then be extracted from vortex B as described above, utilizing a fixed or movable extraction point extending into vortex B, such as extraction pipe 140. It will be appreciated that in such case, back pressure may be applied, such as by back pressure device 148, to assist in formation of vortex B and removal of second liquid through extraction pipe 140.

Figure 8:
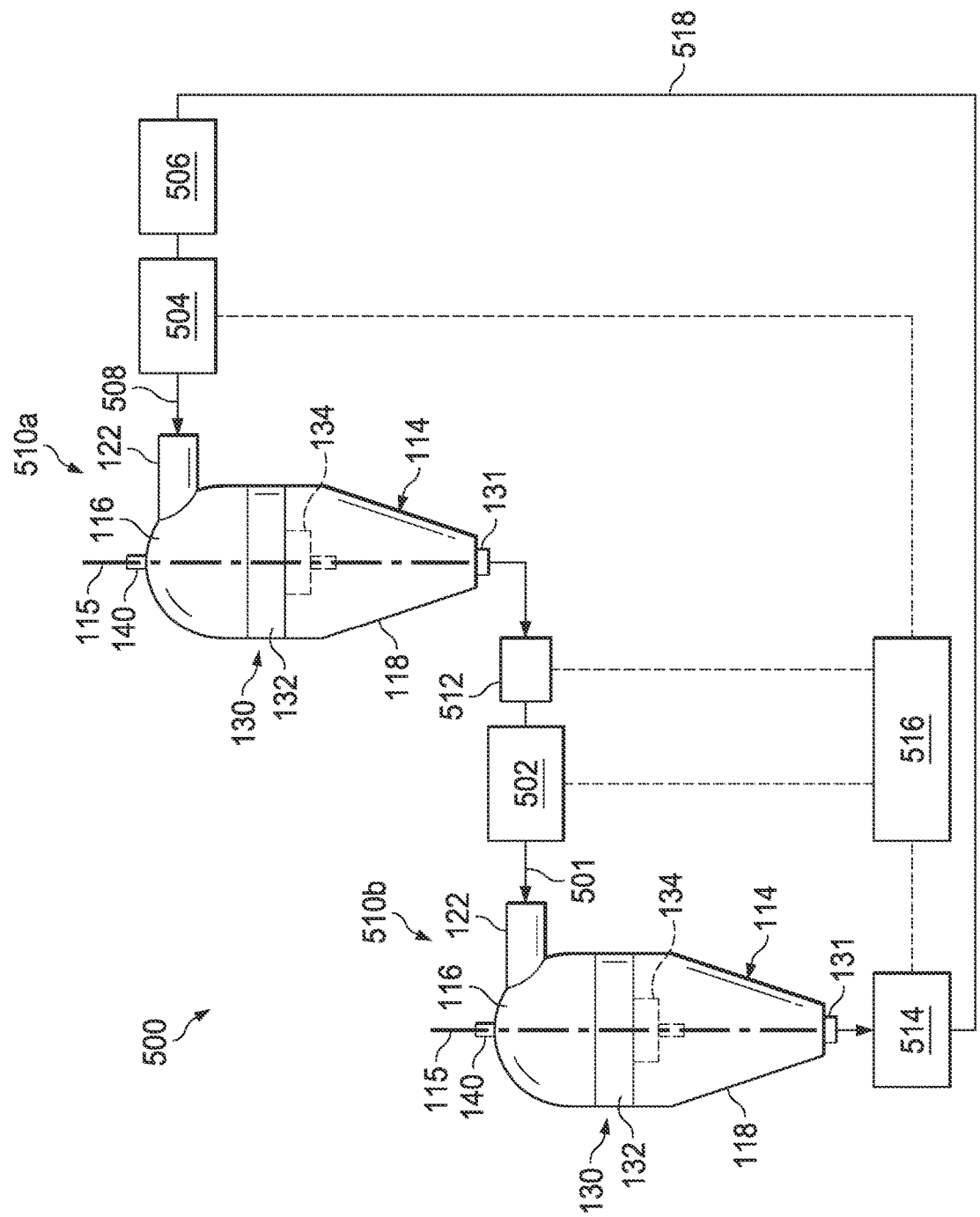
FIG. 8 illustrates a two-phase flow separator in a system for monitoring fuel combustion by an engine.

Turning to FIG. 8, in one application, the above described fluid separation apparatus may be used to measure fuel combustion/consumption of an engine. Shown in FIG. 8 is an engine system 500 for measuring fuel combustion or consumption by an engine 502, such as an internal combustion engine. Specifically, a fuel pump 504 pumps fuel along a fuel supply line 508 from a fuel vessel 506 to engine 502. A first fluid separation apparatus 510a, as described herein is disposed along the fuel line 508 upstream of the engine 502 to remove air from liquid fuel prior to injection of the liquid fuel into the engine 502. Upon treatment of the fuel by first separator system 510a, a sensor 512 measures a property of the fuel, such as volume of liquid fuel delivered to engine 502, after which, the fuel is injected into the engine 502. In some embodiments, a pump may also be provided downstream of second fluid separation apparatus 510b to draw combustion fluid flow into second fluid separation apparatus 510b, or alternatively incorporated into second fluid separation apparatus 510b to draw fluid flow into the system. Thereafter exhaust from the engine is directed to a second fluid separation apparatus 510b where the combustion gases are separated from uncombusted liquid fuel. A sensor 514 measures a property of the fuel, such as the volume of uncombusted liquid fuel. The amount of fuel injected into the engine 502 as measured by sensor 512 and the amount of uncombusted fuel as measured by sensor 514 can then be compared to optimize operation of engine 502. In this regard, a controller 516 may be provided to receive data from sensors 512 and 514 and compare the data. Controller 516 may also be utilized to make adjustments to engine 502 and/or pump 504 in response to the comparison, such as altering the amount of liquid fuel injected into a combustion chamber (not shown) of engine 502 or altering the amount of combustion air mixed with the liquid fuel of engine 502 or adjusting the flow rate of pump 504. Likewise, controller 516 may also receive data and/or control operation of one or both separator systems 510a, 510b as generally described herein in order to optimize operation of each by adjusting flowrate into separator system 510a, 510b as well as back pressure applied to liquid fuel stream within each separator system 510a, 510b. The first separator system 510a separates fuel flow from fuel vessel 506 into liquid fuel and air. The second separator system 510b separates exhaust flow from engine 502 into exhaust gases and uncombusted liquid fuel.

Thus, in some embodiments, fluid separation apparatuses 510 may generally include a body 114 extending along a central axis 115 and having an inlet chamber 116 and a first fluid chamber 118. Inlet chamber 116 is shaped to promote circular swirling flow to the input fluid introduced thereto. In one or more embodiments, inlet chamber 116 is an annular chamber having a bowl shape with a gradually increasing inlet chamber diameter. The first fluid chamber 118 may be a conical trapezoidal shape with a diameter that gradually reduces along its length. Positioned between the inlet chamber and the first fluid chamber 118 is an impeller. In one or more embodiments, impeller 130 is fixed relative to inlet chamber 116 and first fluid chamber 118. Impeller 130 may generally include an outer impeller blade section 132 in fluid communication with an inner impeller blade section 134. An extraction pipe 140 may extent into first fluid chamber 118 adjacent inner impeller blade section 134. In some embodiments, extraction pipe 140 generally passes through inlet chamber 116 and the center of impeller 30 along central axis 115. As an input fluid is introduced into fluid separation apparatus 110 via an inlet 122, the input fluid is directed along a first circular flow path formed by inlet chamber 116. The first circular flow path may have a diameter that gradually increases along the length of the flow path from the beginning of the first circular flow path to the end of the first circular flow path. At the end of the first circular flow path, the input fluid is directed along a second spiral flow path that reduces from an impeller inlet diameter to an impeller outlet diameter. The second spiral flow path is formed of the blade sections 132, 134 of the fixed impeller 130. Adjacent the impeller outlet diameter, a central envelope or vortex is formed by a lighter density fluid component, while a generally toroidal or conical shaped flow of a heavier density fluid component is formed at a third diameter about the lighter density envelope. Finally, the heavier density fluid component is directed along a third circular flow path formed by the first fluid chamber 118 to an outlet 131. The third circular flow path may have a diameter that gradually decreases along the length of the flow path from the beginning of the third circular flow path to the end of the third circular flow path. For the avoidance of doubt, fluid separation apparatuses 510 may be any of the fluid separation apparatuses described in this disclosure.

In an alternative embodiment of the system of FIG. 8, fluid separation apparatus 510*a* may be eliminated and the amount of uncombusted liquid fuel may be recovered as described utilizing fluid separation apparatus 510*b*. While in some embodiments the recovered uncombusted fuel may simply be returned to fuel vessel 506 via a return line 518, in other embodiments, the uncombusted fuel recovered by fluid separation apparatus 510*b* may be analyzed, such as with sensor 514 and utilized to make adjustments to engine 502 in order to improve efficiency of engine 502.

Figure 9:
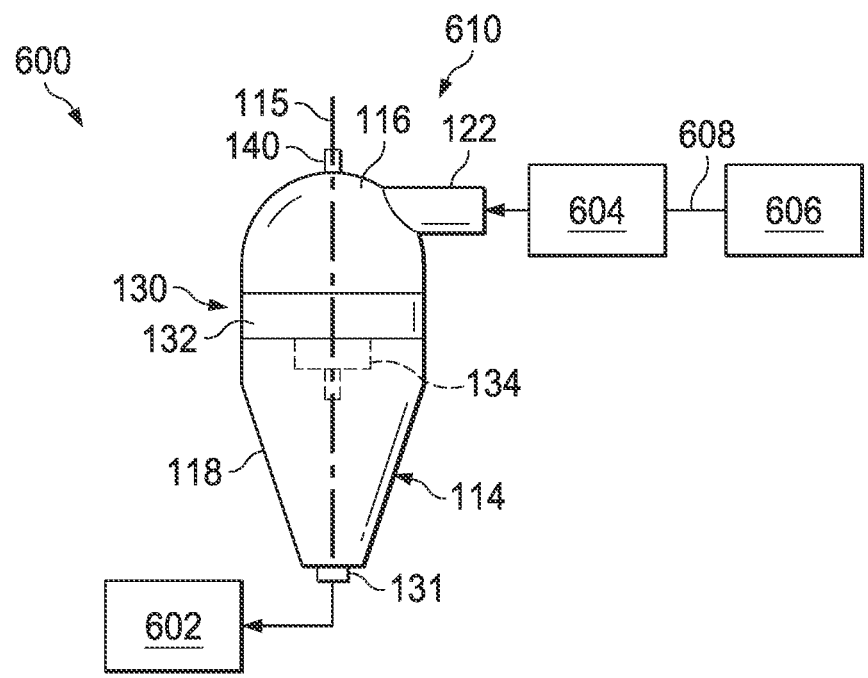
FIG. 9 illustrates a two-phase flow separator in a system for improving operation of an internal combustion engine.

Turning to FIG. 9, in another application, the above described fluid separation apparatus may be used to improve engine performance by removing air from liquid fuel prior to injection into an internal combustion engine. Shown in FIG. 9 is an engine system 600 for treating liquid fuel, such as gasoline, diesel, methanol, ethanol or other liquid fuel, prior to injection into an engine 602. Specifically, a fuel pump 604 pumps fuel along a fuel supply line 608 from a fuel vessel 606, such as a vehicle fuel tank, to engine 602 for combustion. A first fluid separation apparatus 610 as described herein is disposed along the fuel line 608 upstream of the engine 602 to remove air from liquid fuel prior to injection of the liquid fuel into the engine 602. The separator system 610 separates fuel flow from fuel vessel 606 into liquid fuel and air. For the avoidance of doubt, fluid separation apparatuses 610 may be any of the fluid separation apparatuses described in this disclosure.

Fluid separation apparatus 610 may generally include a body 114 extending along a central axis 115 and having an inlet chamber 116 and a first fluid chamber 118. Inlet chamber 116 is shaped to promote circular swirling flow to the input fluid introduced thereto. In one or more embodiments, inlet chamber 116 is an annular chamber having a bowl shape with a gradually increasing inlet chamber diameter. The first fluid chamber 118 may be a conical trapezoidal shape with a diameter that gradually reduces along its length. Positioned between the inlet chamber and the first fluid chamber 118 is an impeller. In one or more embodiments, impeller 130 is fixed relative to inlet chamber 116 and first fluid chamber 118. Impeller 130 may generally include an outer impeller blade section 132 in fluid communication with an inner impeller blade section 134. An extraction pipe 140 may extent into first fluid chamber 118 adjacent inner impeller blade section 134. In some embodiments, extraction pipe 140 generally passes through inlet chamber 116 and the center of impeller 30 along central axis 115. As an input fluid is introduced into fluid separation apparatus 110 via an inlet 122, the input fluid is directed along a first circular flow path formed by inlet chamber 116. The first circular flow path may have a diameter that gradually increases along the length of the flow path from the beginning of the first circular flow path to the end of the first circular flow path. At the end of the first circular flow path, the input fluid is directed along a second spiral flow path that reduces from an impeller inlet diameter to an impeller outlet diameter. The second spiral flow path is formed of the blade sections 132, 134 of the fixed impeller 130. Adjacent the impeller outlet diameter, a central envelope or vortex is formed by a lighter density fluid component, while a generally toroidal or conical shaped flow of a heavier density fluid component is formed at a third diameter about the lighter density envelope. Finally, the heavier density fluid component is directed along a third circular flow path formed by the first fluid chamber 118 to an outlet 131. The third circular flow path may have a diameter that gradually decreases along the length of the flow path from the beginning of the third circular flow path to the end of the third circular flow path. For the avoidance of doubt, fluid separation apparatuses 610 may be any of the fluid separation apparatuses described in this disclosure.

Figure 10:
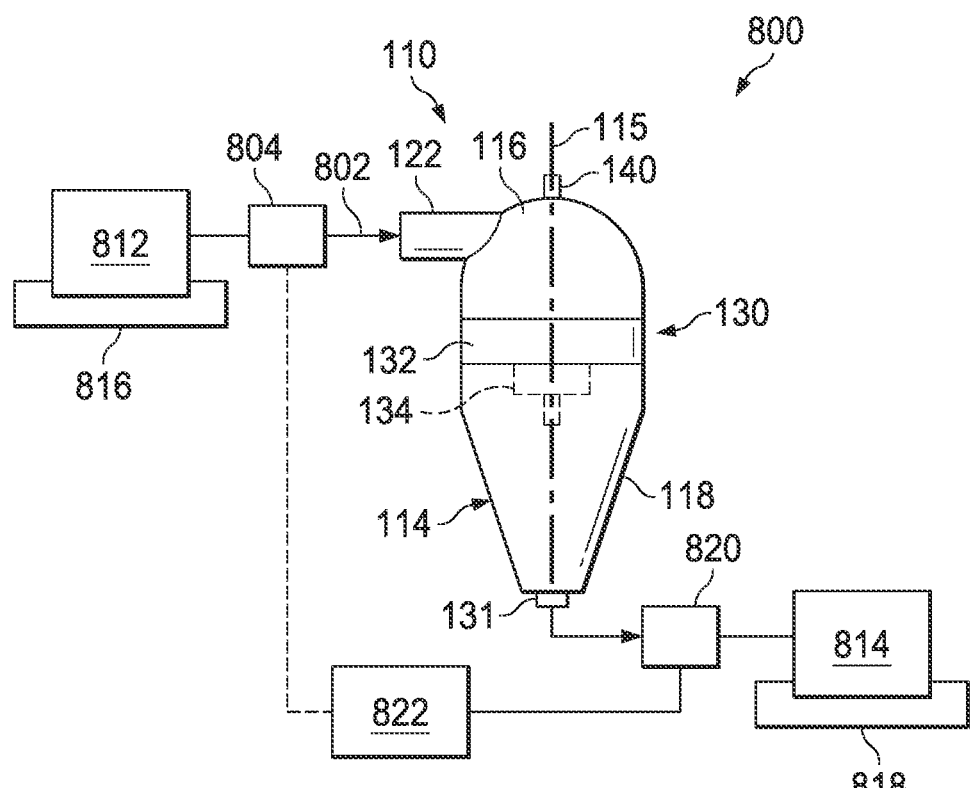
FIG. 10 illustrates a two-phase flow separator in a system for fuel bunkering operations.

Turning to FIG. 10, in another application, the above described fluid separation apparatus may be used in fuel bunkering operations to transfer fuel, such as fuel oil, from one fuel storage tank to another fuel storage tank, such as transferring fuel from a fuel storage tank to the on-board fuel tank of a marine vessel. Bunker fuel generally refers to any type of fuel used aboard ships. Bunker fuels may be delivered to commercial ships via bunker vessels such as barges, which often hold the bunker fuel in large tanks on the vessel, or from terminals with the fuel tanks located on land. The practice of delivering bunker fuels is commonly referred to as "bunkering." The bunker fuel is typically pumped from the storage tank as may be on the bunker barge to storage tanks on commercial ships. In any event, the pumping of fuel in bunkering operations, especially as the vessels containing the fuel are emptied, larger amounts of air tend to be drawn in and pumped with the fuel, rendering pumping difficult and resulting in inaccurate measurements of fuel. Shown in FIG. 10 is a fluid separation apparatus 800 disposed along a fuel line 802 between a first fuel storage tank 812 and the fuel tank to which the fuel is being pumped, namely a second fuel storage tank 814. First fuel storage tank 812 may be carried on a marine vessel, such as marine barge 816, or deployed dockside on land. Second storage fuel tank 814 may likewise be deployed on land or located on a marine vessel, such as ship 818. A fuel pump 804 may be utilized between first fuel storage tank 812 and fluid separation apparatus 800 to pump fuel to second fuel storage tank 814. A liquid measurement device 820, such as a sensor, may be positioned along fuel line 802 between fluid separation apparatus 800 and second fuel storage tank 814. A controller 822 may be utilized to monitor sensor 820, and in some embodiments, based on the monitored liquid, control pump 804.

Fluid separation apparatus 800 may generally include a body 114 extending along a central axis 115 and having an inlet chamber 116 and a first fluid chamber 118. Inlet chamber 116 is shaped to promote circular swirling flow to the input fluid introduced thereto. In one or more embodiments, inlet chamber 116 is an annular chamber having a bowl shape with a gradually increasing inlet chamber diameter. The first fluid chamber 118 may be a conical trapezoidal shape with a diameter that gradually reduces along its length. Positioned between the inlet chamber and the first fluid chamber 118 is an impeller. In one or more embodiments, impeller 130 is fixed relative to inlet chamber 116 and first fluid chamber 118. Impeller 130 may generally include an outer impeller blade section 132 in fluid communication with an inner impeller blade section 134. An extraction pipe 140 may extent into first fluid chamber 118 adjacent inner impeller blade section 134. In some embodiments, extraction pipe 140 generally passes through inlet chamber 116 and the center of impeller 30 along central axis 115. As an input fluid is introduced into fluid separation apparatus 110 via an inlet 122, the input fluid is directed along a first circular flow path formed by inlet chamber 116. The first circular flow path may have a diameter that gradually increases along the length of the flow path from the beginning of the first circular flow path to the end of the first circular flow path. At the end of the first circular flow path, the input fluid is directed along a second spiral flow path that reduces from an impeller inlet diameter to an impeller outlet diameter. The second spiral flow path is formed of the blade sections 132, 134 of the fixed impeller 130. Adjacent the impeller outlet diameter, a central envelope or vortex is formed by a lighter density fluid component, while a generally toroidal or conical shaped flow of a heavier density fluid component is formed at a third diameter about the lighter density envelope. Finally, the heavier density fluid component is directed along a third circular flow path formed by the first fluid chamber 118 to an outlet 131. The third circular flow path may have a diameter that gradually decreases along the length of the flow path from the beginning of the third circular flow path to the end of the third circular flow path. For the avoidance of doubt, fluid separation apparatuses 510 may be any of the fluid separation apparatuses described in this disclosure. For the avoidance of doubt, fluid separation apparatuses 800 may be any of the fluid separation apparatuses described in this disclosure.

Thus, fuel is removed from the first tank 812, passed through fluid separation apparatus 800 and then directed to the second tank 814. The fuel entering the inlet 122 of inlet chamber 116 may have a large proportion of air included with the liquid fuel. The liquid fuel exiting the outlet 131 of first fluid chamber 118, after having passed along the first circular flow path, the second spiral flow path, and the third circular flow path, has been substantially scrubbed of the entrained air, which is removed through extraction pipe 140.

Figure 11:
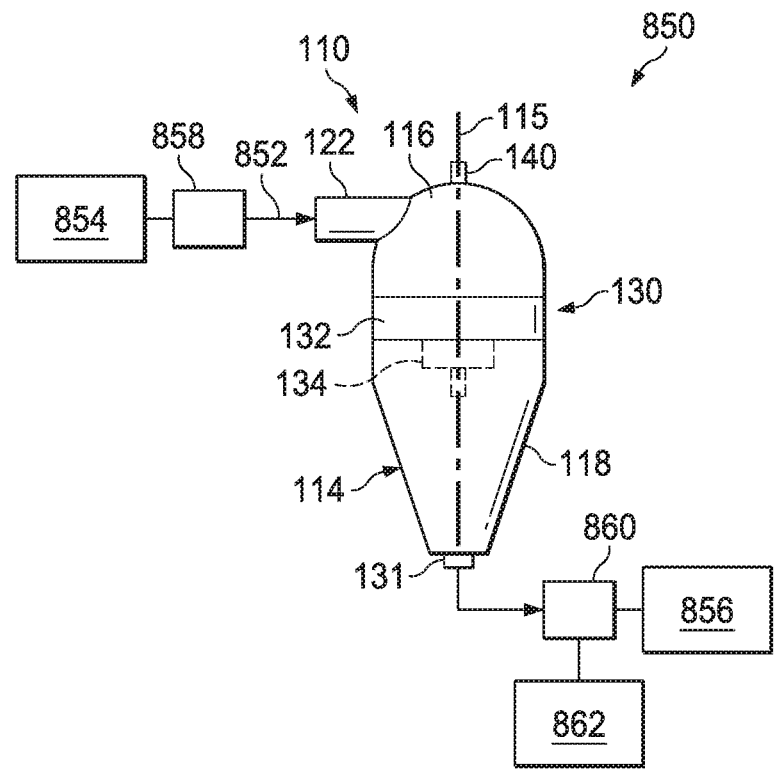
FIG. 11 illustrates a two-phase flow separator in a system for transferring liquids between tanks.

Turning to FIG. 11, in another application, the above described fluid separation apparatus may be used in the liquid transfer systems between storage tanks or vessels (on-land or marine) to ensure that the volume of liquid transferred is accurately measured. Shown in FIG. 11 is a fluid separation apparatus 850 disposed along a supply line or pipeline 852 between a first liquid storage tank 854 and a second liquid storage tank 856. As described herein one or both of first storage tank 854 and second storage tank 856 may be a carried on a vehicle such as a truck or rail car, barge or the like or be a fixed structure. Similarly, storage tanks 854, 856 may be manufactured containers or reservoirs, and may be utilized for storage of any liquid, including without limitation, chemicals, hydrocarbons, fuel, milk, or other consumable liquids. Similarly, storage tanks 854, 856 may be disposed for long term or temporary storage of liquids, or may be transitory containers or vessels of a larger manufacturing or processing system, such as a cracking tower. In any event, a liquid pump 858 may be utilized between first storage tank 854 and fluid separation apparatus 850 to pump liquid to second storage tank 856. A liquid measurement device 860, such as a sensor, may be positioned along pipeline 852 between fluid separation apparatus 850 and second storage tank 856. A controller 862 may be utilized to monitor sensor 860, and in some embodiments, based on the monitored liquid, control pump 858.

Thus, in some embodiments, fluid separation apparatus 850 may generally include a body 114 extending along a central axis 115 and having an inlet chamber 116 and a first fluid chamber 118. Inlet chamber 116 is shaped to promote circular swirling flow to the input fluid introduced thereto. In one or more embodiments, inlet chamber 116 is an annular chamber having a bowl shape with a gradually increasing inlet chamber diameter. The first fluid chamber 118 may be a conical trapezoidal shape with a diameter that gradually reduces along its length. Positioned between the inlet chamber and the first fluid chamber 118 is an impeller. In one or more embodiments, impeller 130 is fixed relative to inlet chamber 116 and first fluid chamber 118. Impeller 130 may generally include an outer impeller blade section 132 in fluid communication with an inner impeller blade section 134. An extraction pipe 140 may extent into first fluid chamber 118 adjacent inner impeller blade section 134. In some embodiments, extraction pipe 140 generally passes through inlet chamber 116 and the center of impeller 30 along central axis 115. As an input fluid is introduced into fluid separation apparatus 110 via an inlet 122, the input fluid is directed along a first circular flow path formed by inlet chamber 116. The first circular flow path may have a diameter that gradually increases along the length of the flow path from the beginning of the first circular flow path to the end of the first circular flow path. At the end of the first circular flow path, the input fluid is directed along a second spiral flow path that reduces from an impeller inlet diameter to an impeller outlet diameter. The second spiral flow path is formed of the blade sections 132, 134 of the fixed impeller 130. Adjacent the impeller outlet diameter, a central envelope or vortex is formed by a lighter density fluid component, while a generally toroidal or conical shaped flow of a heavier density fluid component is formed at a third diameter about the lighter density envelope. Finally, the heavier density fluid component is directed along a third circular flow path formed by the first fluid chamber 118 to an outlet 131. The third circular flow path may have a diameter that gradually decreases along the length of the flow path from the beginning of the third circular flow path to the end of the third circular flow path. For the avoidance of doubt, fluid separation apparatuses 850 may be any of the fluid separation apparatuses described in this disclosure.

Thus, liquid is removed from the first tank 854, passed through system 850 and then directed to the second tank 856. The liquid entering the inlet 122 of inlet chamber 116 may have a large proportion of air included with the liquid which air may have been entrained in the liquid through various processes, such as through manufacturing or treatment of the liquid or simply handling of the liquid. The liquid exiting the outlet 131 of first fluid chamber 118 after having passed along the first circular flow path, the second spiral flow path, and the third circular flow path, has been substantially scrubbed of the entrained air, which is removed through extraction pipe 140.

Figure 12:
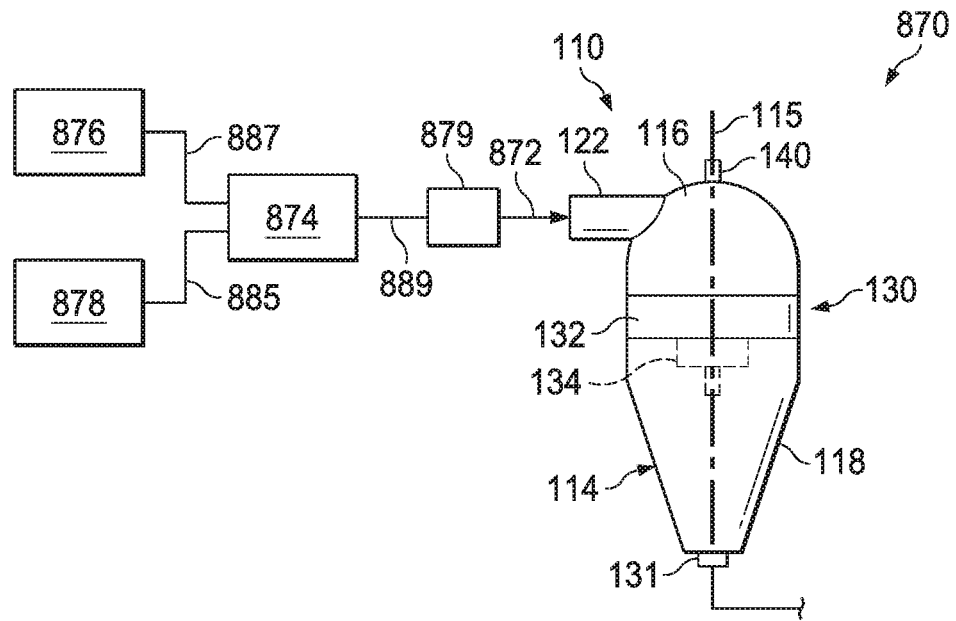
FIG. 12 illustrates a two-phase flow separator in a system utilized in a manufacturing process.

Turning to FIG. 12, in another application, the above described fluid separation apparatus may be used in various manufacturing processes such as the processing of chemicals or the manufacture of chemicals or food products.

In one or more embodiments of a manufacturing process, the fluid separation apparatus may be used to remove gas from any liquid component to improve purity or product quality. As an example, in the processing of milk, the presence of air can negatively impact the taste of the milk. The presence of air in milk can also decrease the longevity of the milk before spoilage. Relatedly, entrained gas or air in a fluid that is exposed to heat during the manufacturing processes may expand during heating, impacting the quality of the final product being manufactured. For example, in the manufacture of asphalt shingles, the presence of gas in the liquid asphalt used to manufacture the shingles may reduce the quality of the shingles. For these reasons, it is desirable to utilize the described fluid separation apparatus to remove gas entrained in the manufacturing fluid.

In one or more other embodiments of a manufacturing process, the fluid separation apparatus may be used to extract a target liquid from a heterogeneous liquid mixture during a manufacturing process. For example, it is often desirable to extract a liquid substance from plant biomass or other biomass. The biomass may first be ground, chopped, crushed, pulverized or similarly processing and mixed with water to release the target liquid substance into the water, thereby yielding at heterogeneous liquid mixture to be used as the input liquid for the above described fluid separation apparatus of the disclosure. In this regard, the wet biomass may be agitated to further enhance release of the target liquid from the wet biomass. In any event, the heterogeneous liquid mixture may then be introduced into a fluid separation apparatus of the disclosure to recover the target liquid from the heterogeneous liquid mixture. For example, the above described process may be used to recover cannabidiol oil from hemp biomass.

For any of the manufacturing processes, shown in FIG. 12 is a fluid separation apparatus 870 disposed along a conduit 872 downstream of a processor 874. Processor 874 may be disposed to mix or blend a manufacturing liquid from a liquid storage tank or source 876 and an additive from an additive source 878, such as a storage vessel or solids storage container. The additive may be a solid, such as a food component or biomass, or another liquid, such as a chemical. The liquid storage tank or source 876 is in fluid communication with the processor 874 via a liquid supply line 887. In the case where the additive is a solid, such as pulverized plant biomass, a solid delivery system 885, such as a conveyor or auger, may be utilized to supply a solid from the additive source 878 to the processor 874. In this regard, processor 874 may be a blender used in various food manufacturing or preparation, or chemical manufacturing. In other embodiments, processor 874 may be a blender used in hydraulic fracturing operations to mix a proppant with a fluid prior to injection into a wellbore by high pressure hydraulic fracturing pumps. In other embodiments, processor 874 may be one or more of a grinder, a chopper, a crusher, a pulverizer a mixer or a blender. In one or more embodiments, mixing or blending of the liquid and solid may introduce undesired entrained gas, such as air, within the blended product, which generally may be in the form of a liquid or slurry. In other embodiments, mixing or blending of the liquid and solid may promote release of a target liquid, such as oil, from the solid into the manufacturing liquid from the liquid storage tank or source 876. In any event, a liquid pump 879 may be utilized between processor 874 and fluid separation apparatus 870 to pump liquid to fluid separation apparatus 870 along a product delivery line 889. The separator system 870 separates fluid flow from processor 874 into a primarily fluid stream and a secondary fluid stream. In one or more embodiments, the primary fluid stream is a consumable beverage, such as milk. In one or more embodiments, the primary fluid stream is a hydraulic fracturing slurry. In one or more embodiments, the primary fluid stream is asphalt. In one or more embodiments, the secondary fluid stream is gas, such as air. In one or more embodiments, the secondary fluid stream may be an oil, such as a plant oil or other oil.

Thus, in some embodiments, fluid separation apparatus 870 may generally include a body 114 extending along a central axis 115 and having an inlet chamber 116 and a first fluid chamber 118. Inlet chamber 116 is shaped to promote circular swirling flow to the input fluid introduced thereto. In one or more embodiments, inlet chamber 116 is an annular chamber having a bowl shape with a gradually increasing inlet chamber diameter. The first fluid chamber 118 may be a conical trapezoidal shape with a diameter that gradually reduces along its length. Positioned between the inlet chamber and the first fluid chamber 118 is an impeller. In one or more embodiments, impeller 130 is fixed relative to inlet chamber 116 and first fluid chamber 118. Impeller 130 may generally include an outer impeller blade section 132 in fluid communication with an inner impeller blade section 134. An extraction pipe 140 may extent into first fluid chamber 118 adjacent inner impeller blade section 134. In some embodiments, extraction pipe 140 generally passes through inlet chamber 116 and the center of impeller 30 along central axis 115. As an input fluid is introduced into fluid separation apparatus 110 via an inlet 122, the input fluid is directed along a first circular flow path formed by inlet chamber 116. The first circular flow path may have a diameter that gradually increases along the length of the flow path from the beginning of the first circular flow path to the end of the first circular flow path. At the end of the first circular flow path, the input fluid is directed along a second spiral flow path that reduces from an impeller inlet diameter to an impeller outlet diameter. The second spiral flow path is formed of the blade sections 132, 134 of the fixed impeller 130. Adjacent the impeller outlet diameter, a central envelope or vortex is formed by a lighter density fluid component, while a generally toroidal or conical shaped flow of a heavier density fluid component is formed at a third diameter about the lighter density envelope. Finally, the heavier density fluid component is directed along a third circular flow path formed by the first fluid chamber 118 to an outlet 131. The third circular flow path may have a diameter that gradually decreases along the length of the flow path from the beginning of the third circular flow path to the end of the third circular flow path. For the avoidance of doubt, fluid separation apparatuses 870 may be any of the fluid separation apparatuses described in this disclosure.

In one or more embodiments, a liquid product leaving processor 874 is passed through system 870 in order to remove air from the liquid product before subsequent handing of the liquid product. The liquid product entering the inlet 122 of inlet chamber 116 may have a large proportion of air included with the liquid product which air may have been entrained in the liquid product through various processes, such as mixing or blending by processor 874. The liquid product exiting outlet 131 of first fluid chamber 118, after having passed along the first circular flow path, the second spiral flow path, and the third circular flow path, has been substantially scrubbed of the entrained air, which entrained air may be removed from system 870 through extraction pipe 140.

In one or more other embodiments, a liquid mixture leaving processor 874 is passed through system 870 in order to extract a target liquid from the liquid mixture. The liquid mixture entering the inlet 122 of inlet chamber 116 may have a vehicle liquid base, such as water functioning as the vehicle, with the target liquid mixed with the water which target liquid may have been released into the water base through various processes, such as mixing or blending or agitating by processor 874. The target liquid is removed through extraction pipe 140 and recovered for subsequent use as desired, while the vehicle liquid exiting the outlet 131 of first fluid chamber 118, after having passed along the first circular flow path, the second spiral flow path, and the third circular flow path, has been substantially scrubbed of the target liquid.

In one or more embodiments, in order to prevent damage to pump components, it is desirable to remove air from a hydraulic fracturing slurry prior to introducing the slurry to high pressure hydraulic fracturing pumps. It has been found that unlike the proppant entrained in the hydraulic fracturing fluid, gas bubbles are significantly more harmful to these internal pump components, causing cavitation that erodes the components, which can decrease pump performance, increase pump maintenance and shorten the operational life of the components. Thus, liquid storage tank or source 876 may contain water, gel, foam or other fluid for blending with a solid proppant, such as sand, contained solids storage container 878. Fluid line 887 may deliver the liquid from liquid storage tank 876 to blender 874, while a solid delivery system 885, such as a conveyor or auger, may deliver the proppant from solids storage vessel 878 to blender 874. Once the liquid and solid are blended into a hydraulic fracturing slurry, the slurry is introduced into the inlet 122 of inlet chamber 116 of fluid separation apparatus 870 to remove air from the slurry prior to introducing the slurry into high pressure hydraulic fracturing pumps (not shown) used to pump the slurry into a wellbore (not shown).

In other embodiments, a method of treating multi-phase fluid stream recovered from a wellbore is provided. The method separates the multi-phase fluid stream into a first fluid component comprising primarily a gas phase and a second fluid component comprising primarily a liquid phase. Of course, the first component may include various gaseous hydrocarbons, such as natural gas, and the fluid component may include liquid hydrocarbons, drilling fluids, water and the like, as well as solids, such as cuttings.

Figure 13:
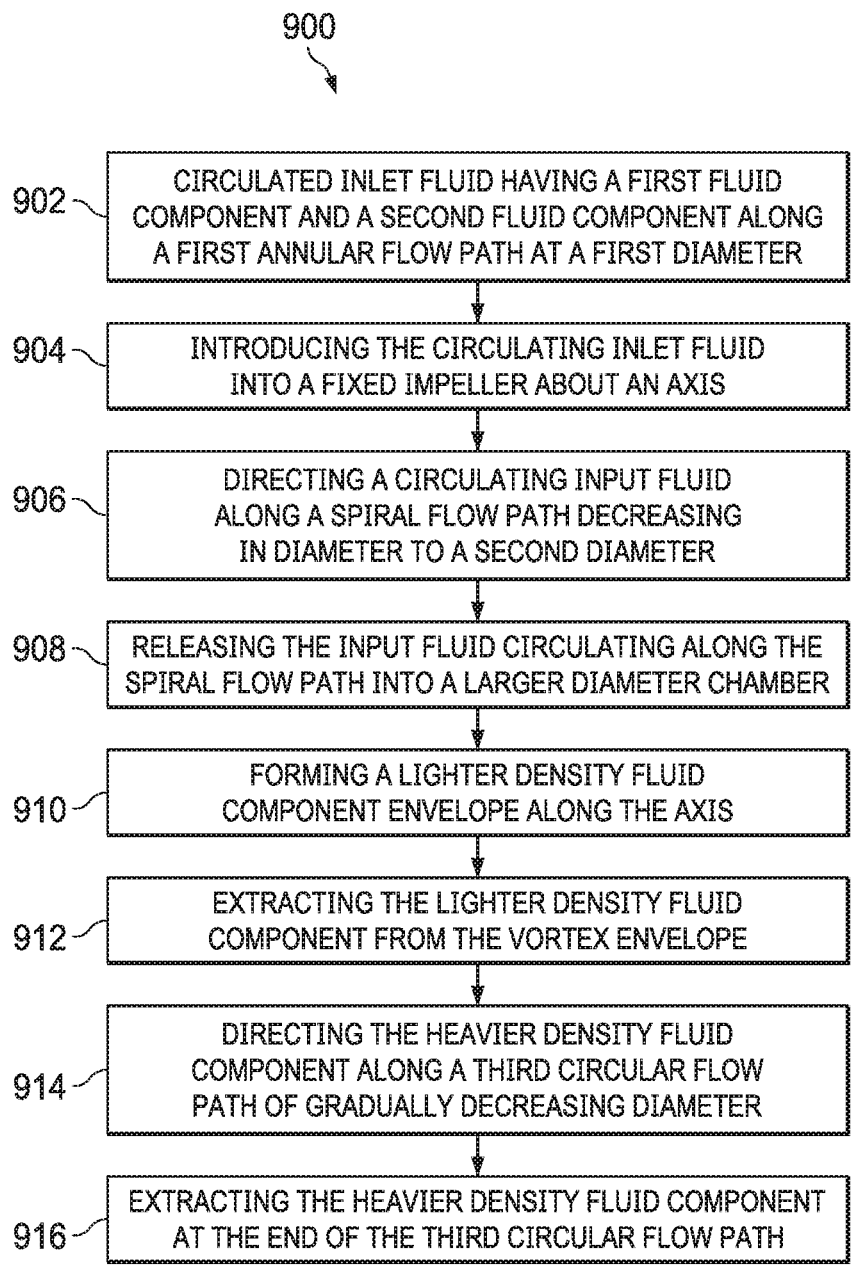
FIG. 13 is a fluid separation method for separation and removal of lighter density fluid from a heavier density fluid.

In FIG. 13, a method 900 for removing one fluid component, such as gas or lighter density fluid, from another fluid component, such as a liquid or heavier density fluid, in a fluid stream is illustrated. In a first step 902, an input fluid having a first fluid component and a second fluid component is circulated along a first annular flow path at a first diameter about axis 115. In this regard, the input fluid may be introduced into an annular chamber at a first diameter and directed along a first annular flow path that has a gradually increasing diameter along the flow path, such as where the annular chamber is bowl shaped.

In step 904, the circulating input fluid circulating at the first diameter is introduced into an impeller. In one or more embodiments, the impeller is fixed. Moreover, the inlet for the impeller is positioned adjacent the first diameter so that the circulating input fluid enters the impeller at the first diameter.

In step 906, the circulating input fluid is directed along a second spiral flow path which is likewise formed about axis 115. In one or more embodiments, the second spiral flow path reduces from the first diameter to a second diameter smaller than the first diameter. In one or more embodiments, the vanes of the impeller form the spiral flow path to direct the circulating fluid from the first diameter to a second diameter smaller than the first diameter.

In step 908, the fluid circulating at the second diameter is released at the second diameter into a chamber having a diameter larger than the second diameter. In one or more embodiments, the chamber is circular or round and generally defined along a central axis. The second diameter is generally adjacent the central axis such that the circulating fluid released at the second diameter is released generally adjacent the central axis. In one or more embodiments, the chamber is an elongated, conical, trapezoidal shaped chamber formed about the central axis.

In step 910, an envelope or vortex of the lighter density fluid component is formed within the chamber generally adjacent the second diameter. In this regard, the heavier density fluid component forms a toroid around the lighter density fluid envelope, the toroid having a third diameter larger than the second diameter. The lighter density envelope is formed along the central axis. In one or more embodiments, the envelope has a diameter of approximately the second diameter, while in other embodiments, the diameter of the envelope may be smaller or larger than the second diameter. In any event, the envelope is formed of swirling lighter density fluid component, which generally remains in the "tight" swirl or vortex formed by the release of the input fluid into the chamber at the second diameter. The shape of the envelope will depend on the density of the lighter density fluid forming the lighter density fluid component. More specifically, the density of the lighter density fluid component will determine the diameter of the envelope as well as the length of the envelope along the central axis. In this regard, the shape of the envelop may change as the density of the lighter density fluid component changes.

In step 912, the lighter density fluid component is extracted or removed from the chamber. In one or more embodiments, the lighter density fluid component is extracted from the chamber along the central axis. An extraction pipe inlet may be positioned in lighter fluid envelope. In one or more embodiments, the extraction pipe extends along the central axis. In one or more embodiments, the position of the extraction pipe and extraction pipe inlet within the envelope is adjusted based on the shape of the envelope. Thus, for example, the extraction pipe may be extended or retracted along central axis based on the shape of the envelope. In this regard, since it is the density of the fluid component forming the envelope that determines the shape of the envelope, the position of the extraction pipe within the envelope may be adjusted based on the density of the lighter density fluid component. In one or more embodiments, the density of the lighter density fluid component may be measured upstream or downstream of the fluid chamber and the position of the extraction pipe may be adjusted based on the measured density. This measurement and position adjustment may be dynamic, and may occur in real time, in order to maximize extraction of the lighter density fluid component from the chamber.

In step 914, the heavier density fluid component is circulated along a third annular flow path that has a diameter that gradually decreases from the third diameter to a fourth diameter along at least a portion of the length of the second annular flow path. In one or more embodiments, the third annular flow path is formed by an elongated, conical, trapezoidal shaped chamber formed about the central axis 115.

In step 916, the heavier density fluid component is extracted or removed from the chamber. In one or more embodiments, the heavier density fluid component may be extracted from the fluid chamber at a fourth diameter that is larger than the second diameter. However, in other embodiments, the second annular flow path may taper to a fourth diameter that is smaller than the second diameter. In one or more embodiments, the heavier density fluid component may be extracted along axis 115 such that the lighter density fluid component is extracted along axis 115 in a first direction and the heaver density fluid component is extracted along axis 115 in an opposite direction.

Thus, a fluid separation apparatus for removing one fluid component, such as lighter density fluid, from another fluid component, such as a liquid, has been described. In one or more embodiments, the fluid separation apparatus may include an annular inlet chamber formed about a central axis and having an inlet in an outer wall of the inlet chamber; a first fluid chamber coaxial with the inlet chamber and extending between a first end and a second end, the first fluid chamber having a hollow conical trapezoidal shape the diameter of which is reduced between the first end and the second end; an impeller disposed between the inlet chamber and the first fluid chamber, wherein the impeller comprises an outer impeller blade section in fluid communication with the inlet chamber adjacent the outer wall and an inner blade section in fluid communication with the first fluid chamber adjacent a central axis of the first fluid chamber; and an extraction pipe extending from the first end of the first fluid chamber, through the impeller and through the annular inlet chamber. In other embodiments, the fluid separation apparatus may include an annular inlet chamber formed about a central axis and having an inlet in an outer wall of the inlet chamber; a first fluid chamber coaxial with the inlet chamber and extending between a first end and a second end, the first fluid chamber having a hollow conical trapezoidal shape the diameter of which is reduced between the first end and the second end; an impeller disposed between the inlet chamber and the first fluid chamber, wherein the impeller comprises a plurality of blades forming a flow path through the impeller, the flow path extending from an inlet at an outer diameter of the impeller to an outlet at an inner diameter of the impeller; and an extraction pipe extending from adjacent the axis in the first fluid chamber. In other embodiments, the fluid separation apparatus may include an annular inlet chamber formed about a central axis and having an inlet in an outer wall of the inlet chamber; a first fluid chamber coaxial with the inlet chamber and extending between a first end and a second end, the first fluid chamber having a hollow conical trapezoidal shape the diameter of which is reduced between the first end and the second end; a second fluid chamber in fluid communication with the second end of the first fluid chamber; a movable extraction pipe extending from the first end of the first fluid chamber. In yet other embodiments, the fluid separation apparatus may include a flow passage of circular cross section formed along a central axis and having an inlet at a first end thereof and an outlet at a second end thereof, said inlet causing said liquid to flow tangentially into said flow passage, said flow passage having a first flow section reducing the diameter of the flow passage gradually and continuously from said inlet toward said outlet port and a second flow section being connected directly with said first flow section; and an extraction pipe coaxially extending into the flow passage from the first end thereof, the extraction pipe having an axially movable portion that can extend or retract along the central axis. In still yet other embodiments, the fluid separation apparatus may include a first fluid chamber having a hollow conical trapezoidal shape whose diameter along a central axis of the first fluid chamber is reduced toward an outlet at the downstream side of the first fluid chamber; a discharge port provided on an upstream side of the first fluid chamber, positioned so that the flow of the fluid containing lighter density fluid to be removed therefrom is introduced into the first fluid chamber via said discharge port, and is discharged along an inner wall tangential direction of the first fluid chamber to form a swirling flow of the fluid containing lighter density fluid to be removed therefrom in the first fluid chamber; a movable extraction pipe having a distal end which projects into the first fluid chamber, and configured to draw a second lighter density fluid gathered in a vicinity of the first fluid chamber by the swirling flow, on a central axis of the first fluid chamber, the moveable extraction pipe having an axially movable portion that can extend or retract along the central axis; and the first fluid chamber outlet configured to discharge the first fluid with lighter density fluid removed therefrom by the first pipe.

Likewise, a fluid separation apparatus for removing gas bubbles from a liquid has been described and may include an annular inlet chamber formed about a central axis and having an inlet in an outer wall of the inlet chamber; a first fluid chamber coaxial with the inlet chamber and extending between a first end and a second end, the first fluid chamber having a hollow conical trapezoidal shape the diameter of which is reduced between the first end and the second end; an impeller disposed between the inlet chamber and the first fluid chamber, wherein the impeller comprises an outer impeller blade section in fluid communication with the inlet chamber adjacent the outer wall and an inner blade section in fluid communication with the first fluid chamber adjacent a central axis of the first fluid chamber; and a gas extraction pipe extending from the first end of the first fluid chamber, through the impeller and through the annular inlet chamber. Other embodiments the fluid separation apparatus for removing gas bubbles from a liquid may include an annular inlet chamber formed about a central axis and having an inlet in an outer wall of the inlet chamber; a first fluid chamber coaxial with the inlet chamber and extending between a first end and a second end, the first fluid chamber having a hollow conical trapezoidal shape the diameter of which is reduced between the first end and the second end; an impeller disposed between the inlet chamber and the first fluid chamber, wherein the impeller comprises a plurality of blades forming a flow path through the impeller, the flow path extending from an inlet at an outer diameter of the impeller to an outlet at an inner diameter of the impeller; and a gas extraction pipe extending from the first end of the first fluid chamber, through the impeller and through the annular inlet chamber. In other embodiments, the fluid separation apparatus for removing gas bubbles from a liquid may include an annular inlet chamber formed about a central axis and having an inlet in an outer wall of the inlet chamber; a first fluid chamber coaxial with the inlet chamber and extending between a first end and a second end, the first fluid chamber having a hollow conical trapezoidal shape the diameter of which is reduced between the first end and the second end; a second fluid chamber in fluid communication with the second end of the first fluid chamber; and a movable extraction pipe extending from the first end of the first fluid chamber, through the impeller and through the annular inlet chamber. Still yet other embodiments the fluid separation apparatus for removing bubbles from a liquid may include a flow passage of circular cross section formed along a central axis and having an inlet at a first end thereof and an outlet at a second end thereof, said inlet causing said liquid to flow tangentially into said flow passage, said flow passage having a first flow section reducing the diameter of the flow passage gradually and continuously from said inlet toward said outlet port and a second flow section being connected directly with said first flow section; and a gas extraction pipe coaxially extending into the flow passage from the first end thereof, the gas extraction pipe having an axially movable portion that can extend or retract along the central axis. Another embodiment of an apparatus for removing bubbles from a liquid may include a first fluid chamber having a hollow conical trapezoidal shape whose diameter along a central axis of the first fluid chamber is reduced toward an outlet at the downstream side of the first fluid chamber; a discharge port provided on an upstream side of the first fluid chamber, positioned so that the flow of the fluid containing gas bubbles to be removed therefrom is introduced into the first fluid chamber via said discharge port, and is discharged along an inner wall tangential direction of the first fluid chamber to form a swirling flow of the fluid containing gas bubbles to be removed therefrom in the first fluid chamber; a movable extraction pipe having a distal end which projects into the first fluid chamber, and configured to suck the second fluid containing gas bubbles of the fluid containing bubbles to be removed therefrom gathered in a vicinity of the first fluid chamber by the swirling flow, on a central axis of the first fluid chamber, the moveable extraction pipe having an axially movable portion that can extend or retract along the central axis; and the first fluid chamber outlet configured to discharge the first fluid with gas bubbles removed therefrom by the first pipe.

In other embodiments, a hydraulic fracturing system has been described, which may generally include a liquid source, an additive source, a blender, a pump in fluid communication with the blender, and a first fluid separation apparatus disposed inline between the blender and the pump. wherein the first fluid separation apparatus includes an annular inlet chamber formed about a central axis and having an inlet in an outer wall of the inlet chamber, the inlet chamber in fluid communication with the fuel inlet; a first fluid chamber coaxial with the inlet chamber and extending between a first end and a second end, the first fluid chamber having a hollow conical trapezoidal shape the diameter of which is reduced between the first end and the second end, the fuel outlet in fluid communication with the second end of the first fluid chamber; an impeller disposed between the inlet chamber and the first fluid chamber, wherein the impeller comprises an outer impeller blade section in fluid communication with the inlet chamber adjacent the outer wall and an inner blade section in fluid communication with the first fluid chamber adjacent a central axis of the first fluid chamber; and an extraction pipe extending from the first end of the first fluid chamber, through the impeller and through the annular inlet chamber, the extraction pipe in fluid communication with the gaseous outlet.

Thus, an engine system for measuring fuel combustion has been described. In one or more embodiments the engine system may include a fuel vessel; a fuel pump in fluid communication with the fuel vessel; a first fluid separation apparatus in fluid communication with the fuel pump, the first fluid separation apparatus having a fuel inlet, a fuel outlet and a gaseous outlet; an engine having a fuel inlet and an exhaust outlet, the fuel inlet of the engine in fluid communication with the first fluid separation apparatus; where the first fluid separation apparatus may include an annular inlet chamber formed about a central axis and having an inlet in an outer wall of the inlet chamber, the inlet chamber in fluid communication with the fuel inlet; a first fluid chamber coaxial with the inlet chamber and extending between a first end and a second end, the first fluid chamber having a hollow conical trapezoidal shape the diameter of which is reduced between the first end and the second end, the fuel outlet in fluid communication with the second end of the first fluid chamber; an impeller disposed between the inlet chamber and the first fluid chamber, wherein the impeller comprises an outer impeller blade section in fluid communication with the inlet chamber adjacent the outer wall and an inner blade section in fluid communication with the first fluid chamber adjacent a central axis of the first fluid chamber; and an extraction pipe extending from the first end of the first fluid chamber, through the impeller and through the annular inlet chamber, the extraction pipe in fluid communication with the gaseous outlet.

Also, a fuel bunkering apparatus has been described. In one or more embodiments, the fuel bunkering apparatus may generally include a first fuel storage tank having an outlet; a second fuel storage tank having an inlet; a first fluid separation apparatus comprising an annular inlet chamber formed about a central axis and having an inlet in an outer wall of the inlet chamber, the inlet in fluid communication with the outlet of the first fuel storage tank; a first fluid chamber coaxial with the inlet chamber and extending between a first end and a second end, the first fluid chamber having a hollow conical trapezoidal shape the diameter of which is reduced between the first end and the second end, the fuel inlet of the second fuel storage tank in fluid communication with the second end of the first fluid chamber; an impeller disposed between the inlet chamber and the first fluid chamber, wherein the impeller comprises an outer impeller blade section in fluid communication with the inlet chamber adjacent the outer wall and an inner blade section in fluid communication with the first fluid chamber adjacent a central axis of the first fluid chamber; and an extraction pipe extending from adjacent the axis within the first fluid chamber.

Likewise, a liquid processing apparatus has been described. In one or more embodiments, the liquid monitoring apparatus may include a first liquid storage vessel having an outlet; a second liquid storage vessel having an inlet; a first fluid separation apparatus comprising an annular inlet chamber formed about a central axis and having an inlet in an outer wall of the inlet chamber, the inlet in fluid communication with the outlet of the first liquid storage vessel; a first fluid chamber coaxial with the inlet chamber and extending between a first end and a second end, the first fluid chamber having a hollow conical trapezoidal shape the diameter of which is reduced between the first end and the second end, the inlet of the second liquid storage vessel in fluid communication with the second end of the first fluid chamber; an impeller disposed between the inlet chamber and the first fluid chamber, wherein the impeller comprises an outer impeller blade section in fluid communication with the inlet chamber adjacent the outer wall and an inner blade section in fluid communication with the first fluid chamber adjacent a central axis of the first fluid chamber; and an extraction pipe extending from adjacent the first end of the first fluid chamber.

In other embodiments, a manufacturing system has been described. The manufacturing system may generally include a first fluid source; a first additive source; a processor in fluid communication with the first fluid source and in communication with the first additive source, the processor having a fluid outlet; a first fluid separation apparatus comprising an annular inlet chamber formed about a central axis and having an inlet in an outer wall of the inlet chamber, the inlet in fluid communication with the outlet of the processor; a first fluid chamber coaxial with the inlet chamber and extending between a first end and a second end, the first fluid chamber having a hollow conical trapezoidal shape the diameter of which is reduced between the first end and the second end; an impeller disposed between the inlet chamber and the first fluid chamber, wherein the impeller comprises an outer impeller blade section in fluid communication with the inlet chamber adjacent the outer wall and an inner blade section in fluid communication with the first fluid chamber adjacent a central axis of the first fluid chamber; and an extraction pipe extending from the first end of the first fluid chamber, through the impeller and through the annular inlet chamber.

Any of the foregoing embodiments may further include any one of the following, either alone or in combination with one another:

- The inlet chamber extends from a first end to a second end and is bowl shaped with the annular chamber gradually increasing in diameter D from the first end to the second end.
- The inlet chamber is a cylinder.
- The inlet chamber extends from a first end to a second end and the first end is enclosed and the second end is open with the impeller fixed in the second open end of the annular inlet chamber to enclose the inlet chamber.
- The blades of the impeller are fixed relative to the inlet chamber wall.
- The inlet is tangentially offset from the axis of the inlet chamber.
- The inlet has a centerline passing therethrough the centerline forms an angle θ with a line passing perpendicularly through central axis of inlet section, wherein the angle θ is acute.
- The inlet has a centerline passing therethrough the centerline forms an angle θ with a line passing perpendicularly through central axis of inlet section, wherein the angle θ is greater than zero degrees.
- The outer blade section comprises a plurality of inwardly spiraling, spaced apart blades.
- The inner blade section comprises a plurality of outwardly spiraling, spaced apart blades extending from an impeller hub.
- The impeller comprises a plurality of blades extending from a hub of the impeller at an inner diameter of the impeller to an outer diameter of the impeller, wherein the impeller blades at the outer diameter of the impeller are adjacent the outer wall of the annular inlet chamber and the impeller blades at the hub of the impeller are adjacent first end of the first fluid chamber.
- The outer impeller blade section comprises a first plurality of blades and the inner impeller blade section comprises a second plurality of blades different from the first plurality.
- The outer impeller blade section and the inner impeller blade section comprise the same blades.
- The extraction pipe has a diameter that is smaller than any diameter of the first fluid chamber.
- The extraction pipe has a first end and a second end, wherein the second end of the extraction pipe is adjacent the first end of the first fluid chamber.
- The second end of extraction pipe extends into the first fluid chamber.
- The second end of the extraction pipe is telescoping.
- The second end of the extraction pipe is movable between a first distance from the impeller and a second distance from the impeller.
- The extraction pipe is coaxial with the impeller and first fluid chamber.
- A pressure regulator for applying back pressure to the second end of first fluid chamber.
- The impeller comprises an impeller hub coaxial with the inlet section and the first fluid section.
- A portion of the first plurality of blades is interleaved with a portion of the second plurality of blades.
- A sensor disposed upstream of the first fluid chamber and utilized to determine the viscosity of a fluid within the inlet chamber.
- A sensor disposed to measure gas cut of fluid flow in the extraction pipe.
- The first flow section is a first fluid chamber having a hollow conical trapezoidal shape whose diameter is reduced toward the outlet of the flow passage.
- The first fluid component is a liquid of a first density and the second fluid component is a liquid of a second density less than the density of the first fluid component.
- The first fluid component is primarily liquid and the second fluid component is primarily lighter density.
- The first fluid component is a liquid of a first weight and the second fluid component is a liquid of a second weight less than the weight of the first fluid component.
- A second fluid chamber in fluid communication with the second end of the first fluid chamber.
- A second fluid separation apparatus comprising an annular inlet chamber formed about a central axis and having an inlet in an outer wall of the inlet chamber, the inlet chamber in fluid communication with the exhaust outlet of the engine; a first fluid chamber coaxial with the inlet chamber and extending between a first end and a second end, the first fluid chamber having a hollow conical trapezoidal shape the diameter of which is reduced between the first end and the second end; an impeller disposed between the inlet chamber and the first fluid chamber, wherein the impeller comprises an outer impeller blade section in fluid communication with the inlet chamber adjacent the outer wall and an inner blade section in fluid communication with the first fluid chamber adjacent a central axis of the first fluid chamber; and an extraction pipe extending from the first end of the first fluid chamber, through the impeller and through the annular inlet chamber, the extraction pipe in fluid communication with the gaseous outlet.
- A high pressure hydraulic fracturing pump in fluid communication with the second end of the first fluid chamber.
- A storage tank integrally formed with the fluid separation apparatus.
- A storage tank wall extending around at least a portion of the first fluid chamber so as to form an additional storage chamber between the first fluid chamber and the storage tank wall.
- A storage tank wall extending around at least a portion of the hollow conical trapezoidal shape of the first fluid chamber so as to form an additional storage chamber between the first fluid chamber and the storage tank wall.
- The storage tank wall extends from a taper of a wall of the first fluid chamber.
- A weir disposed in the additional storage chamber.
- The extraction pipe is in fluid communication with the integrally formed storage tank.
- The extraction pipe is in fluid communication with the additional storage chamber.
- A first outlet positioned above the weir and a second outlet positioned adjacent a base of the weir.
- The weir is an upwardly extending plate.
- The processor is a blender.
- The processor is selected from the group consisting of a grinder, a chopper, a crusher, a pulverizer a mixer and a blender.
- The first additive source is a plant biomass source.
- A solid delivery system extending between the first additive source and the processor.

The solid delivery system is a conveyor.
The solid delivery system is an auger.
The first additive source is a storage vessel.
The first additive source is a liquid tank.
The impeller blades are inwardly spiraling.
A liquid pump in fluid communication with the processor outlet and fluid separation apparatus inlet.
A liquid pump in fluid communication with the outlet of the first liquid storage vessel and the inlet of the first fluid separation apparatus.
A liquid measurement device in fluid communication with the inlet of the second liquid storage vessel.
The first fuel storage tank is on a barge.
The second fuel storage tank is on a ship.
A fuel pump in fluid communication with the outlet of the first fuel storage tank and the inlet of the first fluid separation apparatus.
A liquid measurement device in fluid communication with the inlet of the second fuel storage tank.
An additional pump in fluid communication with the second end of the first fluid chamber of the second fluid separation apparatus.
A sensor disposed to measures a property of the uncombusted fuel discharged from the second fluid separation apparatus.
A sensor disposed to measures a property of the fuel discharged from the first fluid separation apparatus.
The manufacturing system is a plant biomass processor.
A first liquid storage vessel having a first fluid outlet in fluid communication with the inlet of the annular inlet chamber.
An internal combustion engine in fluid communication with the second end of the first fluid chamber.
A second liquid storage vessel having a fluid inlet in fluid communication with the second end of the first fluid chamber.
A manufacturing system in fluid communication with the inlet of the annular inlet chamber.
A manufacturing system in fluid communication with the inlet of the with the second end of the first fluid chamber.
The liquid processing system is a fluid measurement system.
An extraction pipe extending from adjacent the outlet of the impeller.
The extraction pipe extending from adjacent the axis in the first fluid chamber.
An extraction pipe extending from the first end of the first fluid chamber.
An extraction pipe extending from the first fluid chamber through the impeller and through the annular inlet chamber.
An extraction pipe extending from the first fluid chamber along the axis, through the impeller and through the annular inlet chamber.

Thus, a method for removing one fluid component, such as lighter density fluid, from another fluid component, such as a liquid, in a fluid stream has been described. In one or more embodiments, the method may include directing an input fluid directed along a first circular flow path about an axis; at the end of the first circular flow path, directing the input fluid along a second spiral flow path about the axis, which spiral flow path reduces from a first diameter to a second diameter; forming a central vortex envelope of a lighter density fluid component along the axis adjacent the second diameter; forming a generally toroidal or conical shaped flow of a heavier density fluid component at a third diameter about the lighter density vortex envelope; extracting the lighter density fluid component from the vortex envelope; and directing the heavier density fluid component along a third circular flow path formed about the axis. In one or more embodiments, the method may include directing an input fluid directed along a first circular flow path of gradually increasing diameter, the first flow path formed about an axis; at the end of the first circular flow path, directing the input fluid along a second spiral flow path about the axis, which spiral flow path reduces from a first diameter to a second diameter; forming a central vortex envelope of a lighter density fluid component along the axis adjacent the second diameter; forming a generally toroidal or conical shaped flow of a heavier density fluid component at a third diameter about the lighter density vortex envelope; extracting the lighter density fluid component from the vortex envelope; and directing the heavier density fluid component along a third circular flow path of gradually decreasing diameter formed about the axis. In one or more embodiments, the method may include directing an input fluid directed along a first circular flow path of gradually increasing diameter, the first flow path formed about an axis; at the end of the first circular flow path, directing the input fluid along a second spiral flow path about the axis, which spiral flow path reduces from a first diameter to a second diameter; forming a central vortex envelope of a lighter density fluid component along the axis adjacent the second diameter; forming a generally toroidal or conical shaped flow of a heavier density fluid component at a third diameter about the lighter density vortex envelope; extracting the lighter density fluid component from the vortex envelope along the axis; directing the heavier density fluid component along a third circular flow path of gradually decreasing diameter formed about the axis; and extracting the heavier density fluid component along the axis. In one or more embodiments, the method may include introducing a fluid into an annular chamber; circulating the fluid around the annular chamber at a first diameter; directing the fluid circulating at the first diameter into an impeller inlet adjacent the first diameter; utilizing blades of the impeller to direct the circulating fluid from the first diameter to a second diameter smaller than the first diameter; releasing the circulating fluid at the smaller diameter into an elongated, conical, trapezoidal shaped chamber adjacent a central axis of the chamber; forming an envelope of lighter density fluid around the central axis of the elongated, conical, trapezoidal shaped chamber; and positioning an extraction pipe within the envelope to remove lighter density fluid from the elongated, conical, trapezoidal shaped chamber. In other embodiments, the method may include circulating fluid along an annular flow path at a first diameter; directing the circulating at the first diameter into an impeller inlet adjacent the first diameter; utilizing blades of the impeller to direct the circulating fluid from the first diameter to a second diameter smaller than the first diameter; forming a lighter density lighter density fluid envelope adjacent the second smaller diameter and removing the lighter density fluid from the lighter density fluid envelope; and circulating liquid from the circulating fluid at the second diameter at a third diameter larger than the lighter density fluid envelope. In other embodiments, the method includes introducing a fluid into an annular chamber; circulating the fluid around the annular chamber at a first diameter; releasing the circulating fluid into an elongated, conical, trapezoidal shaped chamber adjacent; forming an envelope of lighter density fluid around a central axis of the elongated, conical, trapezoidal shaped chamber; positioning an extraction pipe within the envelope to remove lighter density fluid from the chamber; and adjusting the position of the extraction pipe within the envelope. In one or more embodiments, the method may include introducing a fluid having a first fluid component and a second fluid component into an annular chamber; circulating the fluid around the annular chamber at a first diameter; directing the fluid circulating at the first diameter into an impeller inlet adjacent the first diameter; utilizing blades of the impeller to direct the circulating fluid from the first diameter to a second diameter smaller than the first diameter; releasing the circulating fluid at the smaller diameter into an elongated, conical, trapezoidal shaped chamber adjacent a central axis of the chamber; forming a vortex of one fluid component around the central axis of the elongated, conical, trapezoidal shaped chamber; and positioning an extraction pipe within the vortex to remove the one fluid component from the elongated, conical, trapezoidal shaped chamber. In other embodiments, the method may include circulating a fluid having a first fluid component and a second fluid component along an annular flow path at a first diameter; directing the circulating fluid at the first diameter into an impeller inlet adjacent the first diameter; utilizing blades of the impeller to direct the circulating fluid from the first diameter to a second diameter smaller than the first diameter; forming a vortex of second fluid component adjacent the second smaller diameter and removing the second fluid component; and circulating the first fluid component from the circulating fluid at the second diameter at a third diameter larger than the lighter density fluid envelope. In other embodiments, the method includes introducing having a first fluid component and a second fluid component into an annular chamber; circulating the fluid around the annular chamber at a first diameter; releasing the circulating fluid into an elongated, conical, trapezoidal shaped chamber adjacent; forming a vortex of the second fluid component around a central axis of the elongated, conical, trapezoidal shaped chamber; positioning an extraction pipe within the vortex to remove the second fluid component from the chamber; and adjusting the position of the extraction pipe within the vortex.

Likewise, a method for removing gas bubbles from a liquid has been described and may include introducing a fluid into an annular chamber; circulating the fluid around the annular chamber at a first diameter; directing the fluid circulating at the first diameter into an impeller inlet adjacent the first diameter; utilizing blades of the impeller to direct the circulating fluid from the first diameter to a second diameter smaller than the first diameter; releasing the circulating fluid at the smaller diameter into an elongated, conical, trapezoidal shaped chamber adjacent a central axis of the chamber; forming an envelope of gaseous bubbles around the central axis of the elongated, conical, trapezoidal shaped chamber; and positioning an extraction pipe within the envelope to remove gaseous bubbles from the elongated, conical, trapezoidal shaped chamber. Other embodiments of a method for removing gas bubbles from a liquid may include circulating fluid along an annular flow path at a first diameter; directing the circulating at the first diameter into an impeller inlet adjacent the first diameter; utilizing blades of the impeller to direct the circulating fluid from the first diameter to a second diameter smaller than the first diameter; forming a gaseous bubble envelope adjacent the second smaller diameter and removing gas from the bubble envelope; and circulating liquid from the circulating fluid at the second diameter at a third diameter larger than the bubble envelope. Still yet other embodiments of a method for removing gas bubbles from a liquid may include introducing a fluid into an annular chamber; circulating the fluid around the annular chamber at a first diameter; releasing the circulating fluid into an elongated, conical, trapezoidal shaped chamber adjacent; forming an envelope of gaseous bubbles around a central axis of the elongated, conical, trapezoidal shaped chamber; positioning an extraction pipe within the envelope to remove gaseous bubbles from the chamber; and adjusting the position of the extraction pipe within the envelope. Yet other embodiments of a method for removing one fluid component from another fluid component in a fluid stream may include introducing a fluid having a first fluid component and a second fluid component into an annular chamber; circulating the fluid around the annular chamber at a first diameter; directing the fluid circulating at the first diameter into an impeller inlet adjacent the first diameter; utilizing blades of the impeller to direct the circulating fluid from the first diameter to a second diameter smaller than the first diameter; releasing the circulating fluid at the smaller diameter into an elongated, conical, trapezoidal shaped chamber adjacent a central axis of the chamber; forming a vortex of one fluid component around the central axis of the elongated, conical, trapezoidal shaped chamber; and positioning an extraction pipe within the vortex to remove the one fluid component from the elongated, conical, trapezoidal shaped chamber. Other methods for removing one fluid component from another fluid component in a fluid stream may include circulating a fluid having a first fluid component and a second fluid component along an annular flow path at a first diameter; directing the circulating fluid at the first diameter into an impeller inlet adjacent the first diameter; utilizing blades of the impeller to direct the circulating fluid from the first diameter to a second diameter smaller than the first diameter; forming a vortex of second fluid component adjacent the second smaller diameter and removing the second fluid component; and circulating the first fluid component from the circulating fluid at the second diameter at a third diameter larger than the bubble envelope. Finally, other a methods for removing one fluid component from another fluid component in a fluid stream may include introducing having a first fluid component and a second fluid component into an annular chamber; circulating the fluid around the annular chamber at a first diameter; releasing the circulating fluid into an elongated, conical, trapezoidal shaped chamber adjacent; forming a vortex of the second fluid component around a central axis of the elongated, conical, trapezoidal shaped chamber; positioning an extraction pipe within the vortex to remove the second fluid component from the chamber; and adjusting the position of the extraction pipe within the vortex.

In other embodiments, a method of hydraulic fracturing of a wellbore has been described and may generally include introducing a fluid into a blender; introducing an additive into a blender; utilizing the blender to mix the fluid with the additive to produce a hydraulic fracturing fluid; directing the hydraulic fracturing fluid from the blender along a first circular flow path of gradually increasing diameter, the first flow path formed about an axis; at the end of the first circular flow path, directing the hydraulic fracturing fluid along a second spiral flow path about the axis, which spiral flow path reduces from a first diameter to a second diameter; forming a central vortex envelope of a gaseous fluid along the axis adjacent the second diameter; forming a generally toroidal or conical shaped flow of remaining hydraulic fracturing fluid at a third diameter about the gaseous fluid vortex envelope; extracting the gaseous fluid from the vortex envelope along the axis; directing the remaining hydraulic fracturing fluid along a third circular flow path of gradually decreasing diameter formed about the axis; extracting the hydraulic fracturing fluid along the axis; and directing the extracted hydraulic fracturing fluid to into a hydraulic fracturing pump.

In one or more other embodiments, a manufacturing method has been described and generally includes the steps of delivering a first fluid to a processor; delivering a first additional component to a processor; processing the first fluid and the first additional component to yield a liquid mixture; directing the liquid mixture along a first circular flow path of gradually increasing diameter, the first flow path formed about an axis; at the end of the first circular flow path, directing the liquid mixture along a second spiral flow path about the axis, which spiral flow path reduces from a first diameter to a second diameter; forming a central vortex envelope of a lighter density fluid component of the liquid mixture along the axis adjacent the second diameter; forming a generally toroidal or conical shaped flow of heavier density fluid component of the liquid mixture at a third diameter about the lighter density fluid component vortex envelope; extracting lighter density fluid component from the vortex envelope along the axis; and directing the heavier density fluid component along a third circular flow path of gradually decreasing diameter formed about the axis; extracting the heavier density fluid component along the axis.

In one or more other embodiments, a liquid transfer method has been described and generally includes the steps of pumping a liquid in a first liquid storage vessel to a second liquid storage vessel; directing the pumped liquid from the first liquid storage vessel along a first circular flow path of gradually increasing diameter, the first flow path formed about an axis; at the end of the first circular flow path, directing the liquid along a second spiral flow path about the axis, which spiral flow path reduces from a first diameter to a second diameter; forming a central vortex envelope of a lighter density fluid component of the liquid along the axis adjacent the second diameter; forming a generally toroidal or conical shaped flow of heavier density fluid component of the liquid at a third diameter about the lighter density fluid component vortex envelope; extracting lighter density fluid component from the vortex envelope along the axis; directing the heavier density fluid component along a third circular flow path of gradually decreasing diameter formed about the axis; extracting the heavier density fluid component along the axis; and directing the extracted heavier density fluid component to the second liquid storage vessel.

In one or more other embodiments, a fuel bunkering method has been described and generally includes the steps of pumping a bunker fuel in a first fuel storage tank to a second fuel storage tank; directing the pumped bunker fuel from the first fuel storage tank along a first circular flow path of gradually increasing diameter, the first flow path formed about an axis; at the end of the first circular flow path, directing the bunker fuel along a second spiral flow path about the axis, which spiral flow path reduces from a first diameter to a second diameter; forming a central vortex envelope of a gaseous fluid along the axis adjacent the second diameter; forming a generally toroidal or conical shaped flow of remaining bunker fuel at a third diameter about the gaseous fluid vortex envelope; extracting the gaseous fluid from the vortex envelope along the axis; directing the remaining bunker fuel along a third circular flow path of gradually decreasing diameter formed about the axis; extracting the remaining bunker fuel along the axis; and directing the extracted bunker fuel to the second fuel storage tank.

Any of the foregoing method embodiments may further include any one of the following, either alone or in combination with one another:

Determining the viscosity of the fluid introduced into the annular chamber and adjusting the position of the extraction pipe within the envelope based on the fluid viscosity.

Determining the gas cut of the fluid removed by the extraction pipe and adjusting the position of the extraction pipe within the envelope based on the gas cut.

Extending or retracing the extraction pipe to adjust the position of the extraction pipe within the envelope.

Adjusting the position of the extraction pipe within the envelope.

Dynamically adjusting the position of the extraction pipe within the envelope as lighter density fluid is being removed from the envelope.

Gradually increasing the diameter of the first circular flow path,

Decreasing the diameter of the second spiral flow path.

Gradually decreasing the diameter of the third circular flow path.

Extracting the lighter density fluid component along the axis.

Extracting the heavier density fluid component along the axis.

Applying back pressure to the elongated, conical, trapezoidal shaped chamber and utilizing the back pressure to drive lighter density fluid within the envelope into the extraction pipe.

Releasing fluid into the annular chamber tangentially relative to the central axis of the chamber.

Circulating liquid from the circulating fluid at the second diameter at a third diameter larger than the lighter density fluid envelope.

Increasing a pressure differential between the elongated, conical, trapezoidal shaped chamber and the extraction pipe to enhance flow of lighter density fluid into the extraction pipe.

Removing circulating liquid from the elongated, conical, trapezoidal shaped chamber.

The first fluid component is a liquid of a first density and the second fluid component is a liquid of a second density less than the density of the first fluid component.

The first fluid component is primarily liquid and the second fluid component is primarily lighter density.

The first fluid component is a liquid of a first weight and the second fluid component is a liquid of a second weight less than the weight of the first fluid component.

The additive is a chemical.

The additive is a proppant.

Utilizing the hydraulic fracturing pump to inject the first fluid component into a wellbore.

The additive is proppant.

The additive is a chemical.

The additive is liquid.

The additive is a plant biomass.

The additive is hemp biomass.

Delivering a first additional component comprises delivering plant biomass to the processor; and extracting lighter density fluid component comprises extracting plant oil.

The plant biomass is hemp biomass.

The plant oil is cannabidiol oil.

Mixing a fluid with an additive to produce a hydraulic fracturing fluid.

Mixing a fluid with a chemical to produce a hydraulic fracturing fluid.

Utilizing the hydraulic fracturing pump to pump the hydraulic fracturing fluid into a wellbore.

Utilizing a blender to blend a proppant into the hydraulic fracturing fluid prepared by the hydration unit.

Utilizing a hydration unit to prepare a hydraulic fracturing fluid prior to introduction into a blender.

Applying back pressure to the second fluid component to form a wave of liquid downstream of first fluid component separation to promote flow of the first fluid component away from the stratified two-phase fluid stream.

Pumping the bunker fuel comprises drawing in air from the first storage tank as the first storage tank is emptied.

Measuring the volume of the extracted remaining bunker fuel.

The manufacturing method comprises producing cannabidiol oil.

The manufacturing method comprises processing hemp.

The manufacturing method comprises producing milk.

The manufacturing method comprises producing asphalt products.

The foregoing description and figures are not drawn to scale, but rather are illustrated to describe various embodiments of the present disclosure in simplistic form. Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Accordingly, the intention is to cover all modifications, equivalents and alternatives falling within the spirit and scope of the disclosure as defined by the appended claims.

What is claimed is:

1. A fluid separation apparatus for removing lighter density fluid from a liquid, the fluid separation apparatus comprising:
    an annular inlet chamber formed about a central axis and having an inlet in an outer wall of the annular inlet chamber;
    a first fluid chamber coaxial with the inlet chamber and extending between a first end and a second end, the first fluid chamber having a hollow conical shape with a diameter that reduces between the first end and the second end;
    a fixed impeller disposed between the annular inlet chamber and the first fluid chamber adjacent the first end of the first fluid chamber, wherein the fixed impeller comprises a first outer shroud; a second outer shroud; a hub extending between the first and second outer shrouds, the hub having an outer hub diameter; an impeller outlet formed adjacent the outer hub diameter: an impeller inlet formed adjacent an outer diameter of the first outer shroud; and a plurality of impeller blades that form an outer impeller blade section in fluid communication with the annular inlet chamber adjacent the outer wall of the annular inlet chamber and an inner impeller blade section in fluid communication with the first fluid chamber adjacent a central axis of the first fluid chamber, wherein the outer impeller blade section and the inner impeller blade section are disposed between the first outer shroud and the second outer shroud; and
    an extraction pipe extending from within the first fluid chamber and through the hub.

2. The fluid separation apparatus of claim 1, wherein the inlet chamber extends from a first end to a second end, which second end is adjacent the first end of the first fluid chamber, wherein the inlet chamber is bowl shaped with the annular chamber gradually increasing in diameter D from the first end to the second end.

3. The fluid separation apparatus of claim 1, wherein the inlet chamber extends from a first end to a second end, which second end is adjacent the first end of the first fluid chamber, wherein the inlet chamber first end is enclosed and the impeller is fixed in the second end of the annular inlet chamber to enclose the inlet chamber.

4. The fluid separation apparatus of claim 1, wherein the plurality of impeller blades of the impeller are fixed relative to the inlet chamber wall between the first outer shroud and the second outer shroud together which enclose the plurality of impeller blades and form a flow passage having the impeller inlet at an outer perimeter of the first outer shroud and the impeller outlet adjacent the extraction pipe, the impeller inlet in fluid communication with the annular inlet chamber and the impeller outlet in fluid communication with the first fluid chamber.

5. The fluid separation apparatus of claim 1, wherein the inlet of the annular inlet chamber is tangentially offset from the axis of the inlet chamber.

6. The fluid separation apparatus of claim 1, wherein the outer impeller blade section comprises a plurality of inwardly spiraling, spaced apart impeller blades.

7. The fluid separation apparatus of claim 1, wherein the inner impeller blade section comprises a plurality of outwardly spiraling, spaced apart impeller blades extending from the impeller hub.

8. The fluid separation apparatus of claim 1, wherein the outer impeller blade section comprises a plurality of first impeller blades and the inner impeller blade section comprises a plurality of second impeller blades different from the plurality of first impeller blades.

9. The fluid separation apparatus of claim 1, wherein a portion of the plurality of first impeller blades is interleaved with a portion of the plurality of second impeller blades.

10. The fluid separation apparatus of claim 1, wherein the impeller blades of the outer impeller blade section merge with the corresponding impeller blades of the inner impeller blade section and thus form impeller blades extending from the impeller hub to an inner surface of the fluid separation apparatus.

11. The fluid separation apparatus of claim 1, wherein the extraction pipe has a first end and a second end, wherein the first end of the extraction pipe is adjacent the first end of the first fluid chamber and the extraction pipe extends along the axis through the impeller and through the annular inlet chamber, where the extraction pipe has a diameter less than the diameter of first fluid chamber so as to be sufficiently thin or narrow relative to the diameter of the first fluid chamber so as to maintain a lower pressure within the extraction pipe relative to the first fluid chamber.

12. The fluid separation apparatus of claim 11, wherein the second end of the extraction pipe is movable between a first distance from the impeller and a second distance from the impeller.

13. The fluid separation apparatus of claim 1, wherein the first outer shroud and the second outer shroud are fixed, enclosing the outer impeller blade section, the outer impeller blade section having a plurality of inwardly spiraling impeller blades and forming a flow path through the fixed impeller, the flow path extending from the impeller inlet at the outer diameter of the first outer shroud to the impeller outlet at an inner diameter of the second outer shroud.

14. The fluid separation apparatus of claim 13, wherein the impeller blades, the first outer shroud, and the second outer shroud of the impeller are fixed relative to the inlet chamber wall.

15. The fluid separation apparatus of claim 1, wherein the plurality of impeller blades spiral outward extending between the hub and the outer wall of the inlet chamber, wherein the impeller blades adjacent the outer wall of the inlet chamber form the outer impeller blade section and the impeller blades adjacent the hub form the inner impeller blade section.

16. The fluid separation apparatus of claim 15, wherein the impeller inlet is formed adjacent the outer wall and the impeller outlet is formed adjacent the hub.

17. The fluid separation apparatus of claim 1, wherein the impeller inlet is formed adjacent the outer wall and the impeller outlet is formed adjacent the hub.

18. The fluid separation apparatus of claim 1, wherein the second outer shroud has an opening therein and a second shroud inner diameter defined by the opening; wherein the hub has an outer hub diameter that is less than the second shroud inner diameter so as to form the impeller outlet between the second shroud inner diameter and the hub outer diameter; and the plurality of impeller blades spiral about the hub.

19. The fluid separation apparatus of claim 18, wherein the spiraling impeller blades extend from adjacent the impeller inlet to adjacent the impeller outlet.

20. The fluid separation apparatus of claim 18, wherein the opening in the second outer shroud forms the impeller outlet.

21. The fluid separation apparatus of claim 4, wherein the first outer shroud is a circular plate and the second outer shroud is a circular plate and the first and second outer shrouds are parallel to one another.

* * * * *